(12) United States Patent
Castro et al.

(10) Patent No.: US 9,469,708 B2
(45) Date of Patent: Oct. 18, 2016

(54) POLYMERISATION PROCESS

(71) Applicant: BOREALIS AG, Vienna (AT)

(72) Inventors: Pascal Castro, Helsinki (FI); Kalle Kallio, Porvoo (FI); Laurie Huhtanen, Loviisa (FI); Ville Virkkunen, Helsinki (FI); Noureddine Ajellal, Helsinki (FI)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 14/436,914

(22) PCT Filed: Oct. 17, 2013

(86) PCT No.: PCT/EP2013/071768
§ 371 (c)(1),
(2) Date: Apr. 20, 2015

(87) PCT Pub. No.: WO2014/060541
PCT Pub. Date: Apr. 24, 2014

(65) Prior Publication Data
US 2015/0337060 A1    Nov. 26, 2015

(30) Foreign Application Priority Data
Oct. 18, 2012   (EP) .................................. 12189120

(51) Int. Cl.
| C08F 4/642 | (2006.01) |
| C08F 4/643 | (2006.01) |
| C08F 4/6592 | (2006.01) |
| C08F 110/06 | (2006.01) |
| C08F 10/00 | (2006.01) |
| C08F 4/659 | (2006.01) |

(52) U.S. Cl.
CPC ............. *C08F 110/06* (2013.01); *C08F 10/00* (2013.01); *C08F 4/65908* (2013.01); *C08F 4/65912* (2013.01); *C08F 4/65927* (2013.01)

(58) Field of Classification Search
CPC ............. C08F 4/6592; C08F 4/65908; C08F 4/65912; C08F 4/65926; C08F 110/06; C08F 4/65927
See application file for complete search history.

(56) References Cited

U.S. PATENT DOCUMENTS

| 5,321,189 | A | 6/1994 | Mueller et al. | |
| 6,444,764 | B1 | 9/2002 | Kristen et al. | |
| 2008/0081887 | A1* | 4/2008 | Wang | .................... B01J 31/128  526/127 |
| 2011/0040052 | A1* | 2/2011 | Bburton | .................. C08F 10/14  526/154 |
| 2011/0294972 | A1 | 12/2011 | Chevalier et al. | |
| 2012/0123082 | A1 | 5/2012 | Ogawa et al. | |
| 2012/0245299 | A1 | 9/2012 | Jiang et al. | |
| 2012/0329966 | A1* | 12/2012 | Kwon | ..................... C08F 10/00  526/131 |

FOREIGN PATENT DOCUMENTS

| EP | 0574258 | 12/1993 |
| EP | 0714920 | 6/1996 |
| EP | 1567565 | 1/2008 |
| WO | 94/14856 | 7/1994 |
| WO | 95/12622 | 5/1995 |
| WO | 97/14727 | 4/1997 |
| WO | 98/40418 | 9/1998 |
| WO | 00/09515 | 2/2000 |
| WO | 03/051934 | 6/2003 |
| WO | 2004/050724 | 6/2004 |
| WO | 2005/058916 | 6/2005 |
| WO | 2006/060544 | 6/2006 |
| WO | 2006/069733 | 7/2006 |
| WO | 2006/097497 | 9/2006 |
| WO | 2007/116034 | 10/2007 |
| WO | 2008/151794 | 12/2008 |
| WO | 2009/054832 | 4/2009 |
| WO | 2010/014344 | 2/2010 |
| WO | 2010/077230 | 7/2010 |
| WO | 2010/086932 | 8/2010 |
| WO | 2011/076780 | 6/2011 |
| WO | 2011111980 A2 | 9/2011 |
| WO | 2011/135004 | 11/2011 |
| WO | 2011/135005 | 11/2011 |
| WO | 2012/001051 | 1/2012 |
| WO | 2012/001052 | 1/2012 |
| WO | 2012/034869 | 3/2012 |
| WO | 2012/084961 | 6/2012 |
| WO | 2013/007650 | 1/2013 |
| WO | 2013/160420 | 10/2013 |
| WO | 2014/060534 | 4/2014 |
| WO | 2014/060540 | 4/2014 |

OTHER PUBLICATIONS

Bochmann, M., "The Chemistry of Catalyst Activation: The Case of Group 4 Polymerization Catalysts," Organometallics Review, vol. 29, 2010, pp. 4711-4740.
Elder, M.J., et al., "Synthesis and Performance of ansa-Metallocene Catalysts with Substituted Heterocyclic and Indenyl Ligands," Kinetics and Catalysis, vol. 47, No. 2, 2006, pp. 192-197.
Neudeck, H.K., Aromatische Spirane, 14. Mitt. [1] Darstellung von 2,2'-Spirobi-(s-hydrindacen) und seinen Vorstufen, Monatshefte Für Chemie, Springer Verlag Wien, AT LNKD-DOI:10.1007/BF00809674, vol. 118, No. 5, 1987, XP000981981 ISSN: 0026-9247, pp. 627-657.
Wang, W-j, et al., "Long-Chain Branching in ethylene polymerization using constrained geometry metallocene catalyst," Macromol. Chem. Phys., vol. 199, 1998, pp. 2409-2416.

(Continued)

*Primary Examiner* — Caixia Lu
(74) *Attorney, Agent, or Firm* — Meunier Carlin & Curfman LLC

(57) ABSTRACT

A process for the preparation of a propylene homopolymer comprising polymerizing propylene in the presence of a catalyst comprising: (i) a metallocene complex of a group (IV) metal said metallocene comprising at least two cyclopentadienyl type ligands; (ii) a boron cocatalyst; and (iii) an aluminoxane cocatalyst; said catalyst being in solid form, preferably in solid particulate form, and being free from an external carrier; preferably wherein the melting point of the propylene polymer is controlled by adjusting the amount of or nature of the boron cocatalyst.

14 Claims, No Drawings

(56) References Cited

OTHER PUBLICATIONS

Yano, A., et al., "Propylene polymerization with $Ph_2C(3\text{-}RCp)(Flu)ZrCl_2$ [R=Me, i-Pr, $PhCh_2$, $Me_3Si$] catalysts activated with MAO and $Me_2PhNH$ $B(C_6F_5)_4/i\text{-}Bu_3Al$," Macromol. Chem. Phys, vol. 200, 1999, pp. 2127-2135.

International Search Report, dated Dec. 17, 2013, received in connection with International Application No. PCT/EP2013/071760.

International Search Report, dated Dec. 17, 2013, received in connection with International Application No. PCT/EP2013/071767.

International Search Report, dated Dec. 17, 2013, received in connection with International Application No. PCT/EP2013/071768.

International Search Report and Written Opinion, dated Jul. 28, 2011, received in connection with International Application No. PCT/EP2011/060920.

International Search Report and Written Opinion, dated Jul. 25, 2011, received in connection with International Application No. PCT/EP2011/060921.

Notice of Allowance, dated Sep. 3, 2014, received in connection with U.S. Appl. No. 13/806,421.

Notice of Allowance, dated Jun. 27, 2014, received in connection with U.S. Appl. No. 13/806,386.

Non-final Office Action, dated Feb. 14, 2014, received in connection with U.S. Appl. No. 13/806,421.

Non-final Office Action, dated Feb. 14, 2014, received in connection with U.S. Appl. No. 13/806,386.

Shijing Xiao and Fusheng Yu, "Olefin Coordination Polymerization Catalysts and Polyolefin," Beijing University of Technology Press, Dec. 2002, pp. 130-131.

Exhibit 1: European Patent Application No. 0574258 to Mitsubishi Petrochemical Co., published Jul. 13, 1994.

Exhibit 2: International Publication No. WO 1998/040418 to Basf Aktiengesellschaft, published Sep. 17, 1998 (including an English language abstract).

Exhibit 3: Yano et al., Macromol. Chem. Phys., "Propylene polymerization with $Ph2C(3\text{-}RCp)(Flu)ZrCl2$ [R = Me, i-Pr, PhCH2, Me3Si] catalysts activated with MAO and Me2PhNH.N.B(C6F5)4/i-Bu3Al," 1999, 200:2127-2135.

* cited by examiner

POLYMERISATION PROCESS

This invention relates to the polymerisation of propylene, in particular for the polymerisation of propylene homopolymers using a new catalyst which comprises a metallocene complex along with an aluminoxane and a boron based cocatalyst. The catalyst is in solid form but is free of an external carrier. This combination remarkably allows the formation of polypropylenes, in particular polypropylene homopolymers, with increased melting points. Furthermore, the combination of increased melting point and lower MFR and/or excellent catalyst activity in propylene homopolymerisation is achievable using the process of the invention.

BACKGROUND

Metallocene catalysts have been used to manufacture polyolefins for many years. Countless academic and patent publications describe the use of these catalysts in olefin polymerisation. Metallocenes are now used industrially and polyethylenes and polypropylenes in particular are often produced using cyclopentadienyl based catalyst systems with different substitution patterns.

These metallocenes can be used in solution polymerisation but results of such polymerisations have generally been poor. These metallocenes are therefore conventionally supported on a carrier such as silica. Research has found that heterogeneous catalysis gives rise to better polymer products than homogeneous catalysis (in solution). The use therefore of a support is common place. Despite several years of development of this catalyst technology, there is still room for improved activity of course.

In WO03/051934, the inventors proposed an alternative form of catalyst which is provided in solid form but does not require a conventional external carrier material such as silica. The invention is based on the finding that a homogeneous catalyst system containing an organometallic compound of a transition metal can be converted, in a controlled way, to solid, uniform catalyst particles by first forming a liquid/liquid emulsion system, which comprises as the dispersed phase, said solution of the homogeneous catalyst system, and as the continuous phase a solvent immiscible therewith, and then solidifying said dispersed droplets to form solid particles comprising the said catalyst.

The invention described in WO03/051934 enabled the formation of solid spherical catalyst particles of said organo-transition metal catalyst without using e.g. external porous carrier particles, such as silica, normally required in the art. Thus, problems relating to catalyst silica residues can be solved by this type of catalyst. Further, it could be seen that catalyst particles having improved morphology, will give, due to the replica effect, polymer particles having improved morphology as well.

Although a lot of work has been done in the field of metallocene catalysts, both with conventional supported catalysts as well with solid catalysts prepared according to the principles as described in said WO03/051934, there still remain some problems, which relate especially to the productivity or activity of the catalysts. There remains a need therefore to improve the productivity or activity of the catalysts. Furthermore, there is a need to obtain propylene polymers, having particular properties, such as higher melt temperature (Tm). In addition there is a need to keep the activity or productivity at a desired high level and at the same time produce polymers having higher Tm.

There remains a need therefore to find new catalysts for olefin polymerisation, which are able to produce these polymers with desired properties, especially high melting points (Tm) and which have high activity and/or productivity. Further, it is highly desired in many polymer applications that inorganic residues, e.g. silica residues, in the final product are reduced as much as possible.

As a consequence, the inventors set out to develop a process and a catalyst for that process having a superior polymerisation in terms of higher activity for propylene polymerisation, leading to propylene polymers having higher melting points.

The present inventors have now found that certain olefin polymerisation catalysts are able to solve the problems disclosed above, and which catalysts are not previously described in the art. In particular, the invention combines the use of boron based and aluminoxane cocatalysts with metallocenes in solid catalysts, however, not containing any external support material, essentially prepared using the basic principles of WO03/05194.

The invention provides a process which exhibits remarkable increase in polypropylene melting point due to the use of the solid catalyst material, where no silica support material is used as defined herein. This avoids any problems relating to the use of the conventionally supported catalysts, such as silica supported catalysts.

Whilst both boron based and aluminoxane cocatalysts are well known in the art, they are typically used as alternatives. However, it is also known to use boron activators together with aluminoxanes in some circumstances.

EP-A-0574258 discloses use of boron compounds together with aluminoxanes in single site catalysts. The catalysts are homogeneous and they are used in homogeneous polymerisation where activity increase could be observed.

In J Macromol. Chem Phys, 199, 2409-2416 (1998), there is a disclosure of the use of constrained geometry metallocene type catalysts with both a methyl aluminoxane and trispentafluorophenyl boron activator. In the context of solution phase polyethylene polymerisation, the blend was found to increase catalyst activity.

In the literature, there are also other similar observations, that homogeneous catalyst activity (solution phase polymerisation) was improved by using boron modification, but when heterogeneous catalysis was tried, i.e. when catalysts were supported on silica, activity was lower than that achieved using MAO activators alone.

However, WO1998/140418 discloses that when specific types of boron-compounds, in particular alkyl or aryl boronic acids ($RB(OR')_2$) or cyclic boron compounds, boroxanes, are used with silica supported metallocene catalysts in combination with aluminoxanes, higher activity was seen for ethylene-butene polymerisation.

US2011294972 discloses the use of catalysts of specific transition metal complexes comprising mono-anionic, bidentate triazole ligands in combination with MAO and borate type activators supported on silica in ethylene-butene polymerisation.

In *Macromol. Chem. Phys.* 200, 2127-2135 (1999) page 2128, propylene polymerisation is discussed using a bridged biscyclopentadienyl type catalyst in the presence of both MAO and dimethylanilinium tetrakis(pentafluorophenyl) borate. When the metallocene is activated with MAO alone, there is a change in the polymer melting point ($T_m$). In this case, the presence of both MAO and the boron activator decreased the melting point which is the opposite of the desired goal in the present invention. It is surprising that the combination covered in the present invention allows an increase in melting point therefore.

The present inventors have surprisingly found that the use of both boron based and aluminoxane cocatalysts in combination with the use of a solid, but unsupported metallocene allows the formation of a catalyst which allows increases in the melting point of the propylene polymer formed relative to one produced with only one cocatalyst present. Moreover, this increase in melting point can be achieved at very high catalyst activities and can be accompanied by a reduction in MFR.

SUMMARY OF INVENTION

Thus, viewed from one aspect the invention relates to a process for the preparation of a propylene homopolymer comprising polymerising propylene in the presence of a catalyst comprising:

(i) a metallocene complex of a group (IV) metal said metallocene comprising at least two cyclopentadienyl type ligands;

(ii) a boron cocatalyst; and (iii) an aluminoxane cocatalyst;

said catalyst being in solid form, preferably in solid particulate form, and being free from an external carrier; preferably wherein the melting point of the propylene polymer is controlled by adjusting the amount of or nature of the boron cocatalyst.

Preferably the boron cocatalysts are borate-type cocatalysts.

Ideally, the solid catalyst of the invention is obtainable by a process in which (a) a liquid/liquid emulsion system is formed, said liquid/liquid emulsion system comprising a solution of the catalyst components (i) to (iii) dispersed in a solvent so as to form dispersed droplets; and (b) solid particles are formed by solidifying said dispersed droplets.

Preferably, the process for obtaining the solid catalyst of the invention further involves a prepolymerisation step (c) wherein the solid catalyst from step (b) is prepolymerised with at least one $C_2$-$C_{10}$ alpha-olefin monomer and optionally one or more different $C_2$-$C_{10}$ alpha-olefin comonomers.

Viewed from another aspect the invention provides a process for the preparation of a propylene homopolymer comprising polymerising propylene in the presence of a catalyst comprising:

(i) a metallocene complex of a group (IV) metal said metallocene comprising at least two cyclopentadienyl type ligands;

(ii) a boron cocatalyst; and (iii) an aluminoxane cocatalyst;

said catalyst being in solid form, preferably in solid particulate form, and being free from an external carrier; wherein the melting point of the propylene polymer is at least 152.5° C.

Viewed from another aspect the invention provides a propylene polymer made by a process as hereinbefore defined.

Special benefits are achieved when the catalysts of the invention are used for the formation of a propylene homopolymer, such as isotactic polypropylene. Preferably, the process of the invention is a heterogeneous polymerisation process comprising at least one slurry and/or gas phase polymerisation stage.

DEFINITIONS

The catalysts of the invention are solid but do not contain an external carrier. By external carrier is meant a support such as silica or alumina on which a metallocene might be carried.

DETAILED DESCRIPTION OF THE INVENTION

Metallocene Complex

The invention can be effected with any metallocene complex of a group (IV) metal having at least two cyclopentadienyl type ligands.

The cyclopentadienyl type group ligand has been widely described in the scientific and patent literature for about twenty years. Essentially any ligand containing the general structure:

can be employed herein.

The cyclopentadienyl type ligand can be an unsubstituted or substituted and/or fused cyclopentadienyl ligand, e.g. substituted or unsubstituted cyclopentadienyl, substituted or unsubstituted indenyl, substituted or unsubstituted tetrahydroindenyl or substituted or unsubstituted fluorenyl ligand.

Suitable ligands therefore include:

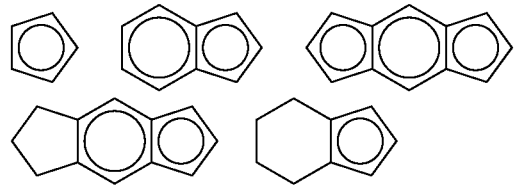

which can obviously be substituted. The use of indenyl ligands is preferred. The metallocene complex of the invention should not therefore comprise a single cyclopentadienyl type ligand. Preferably two such cyclopentadienyl type ligands are present, ideally joined by a bridging group. The substitution pattern on the two ligands may be the same or different. Metallocenes of use in this invention can therefore be symmetrical or asymmetrical.

The two cyclopentadienyl ligands of the present invention can be bridged or unbridged as is well known in the art. It is generally envisaged that the principles of this invention can be applied to any bis cyclopentadienyl type ligand system.

The metallocene complex will comprise at least one metal ion of group (IV) as is well known. This will be η-bonded to the cyclopentadienyl type rings. Such η-bonded metals are typically Zr, Hf or Ti, especially Zr or Hf.

In a preferred embodiment the metallocene complex is a compound of formula (I)

$$(Cp)_2R_nMX_2 \qquad (I)$$

wherein:
each Cp independently is an unsubstituted or substituted and/or fused cyclopentadienyl ligand, e.g. substituted or unsubstituted cyclopentadienyl, substituted or unsubstituted indenyl or substituted or unsubstituted fluorenyl ligand;

the optional one or more substituent(s) being independently selected preferably from halogen, hydrocarbyl (e.g. C1-C20-alkyl, C2-C20-alkenyl, C2-C20-alkynyl, C3-C12-cycloalkyl, C6-C20-aryl or C7-C20-arylalkyl), C3-C12-cycloalkyl which contains 1, 2, 3 or 4 heteroatom(s) in the ring moiety, C6-C20-heteroaryl, C1-C20-haloalkyl, —SiR"$_3$, —OSiR"$_3$, —SR", —PR"$_2$, OR" or —NR"$_2$, each R" is independently a hydrogen or hydrocarbyl, e.g. C1-C20-alkyl, C2-C20-alkenyl, C2-C20-alkynyl, C3-C12-cycloalkyl or C6-C20-aryl; or e.g. in case of —NR"$_2$, the two substituents R" can form a ring, e.g. five- or six-membered ring, together with the nitrogen atom to which they are attached;

R is a bridge of 1-7 atoms, e.g. a bridge of 1-4 C-atoms and 0-4 heteroatoms, wherein the heteroatom(s) can be e.g. Si, Ge and/or O atom(s), wherein each of the bridge atoms may bear independently substituents, such as C1-C20-alkyl, tri(C1-C20-alkyl)silyl, tri(C1-C20-alkyl)siloxy or C6-C20-aryl substituents); or a bridge of 1-3, e.g. one or two, hetero atoms, such as silicon, germanium and/or oxygen atom(s), e.g. —SiR$^{10}$$_2$—, wherein each R$^{10}$ is independently C1-C20-alkyl, C3-12cycloalkyl, C6-C20-aryl or tri(C1-C20-alkyl)silyl-residue, such as trimethylsilyl;

M is a transition metal of Group 3 to 10, preferably of Group 4 to 6, such as Group 4, e.g. Ti, Zr or Hf, especially Zr or Hf;

each X is independently a sigma-ligand, such as H, halogen, C1-C20-alkyl, C1-C20-alkoxy, C2-C20-alkenyl, C2-C20-alkynyl, C3-C12-cycloalkyl, C6-C20-aryl, C6-C20-aryloxy, C7-C20-arylalkyl, C7-C20-arylalkenyl, —SR", —PR"$_3$, —SiR"$_3$, —OSiR"$_3$, —NR"$_2$ or —CH$_2$—Y, wherein Y is C6-C20-aryl, C6-C20-heteroaryl, C1-C20-alkoxy, C6-C20-aryloxy, NR"$_2$, —SR", —PR"$_3$, —SiR"$_3$, or —OSiR"$_3$;

each of the above mentioned ring moieties alone or as a part of another moiety as the substituent for Cp, X, R" or R$^1$ can further be substituted e.g. with C1-C20-alkyl which may contain Si and/or O atoms;

n is 0 or 1.

Suitably, in each X as —CH$_2$—Y, each Y is independently selected from C6-C20-aryl, NR"$_2$, —SiR"$_3$ or —OSiR"$_3$. Most preferably, X as —CH$_2$—Y is benzyl. Each X other than —CH$_2$—Y is independently halogen, C1-C20-alkyl, C1-C20-alkoxy, C6-C20-aryl, C7-C20-arylalkenyl or —NR"$_2$ as defined above, e.g. —N(C1-C20-alkyl)$_2$.

Preferably, each X is halogen, methyl, phenyl or —CH$_2$—Y, and each Y is independently as defined above.

Cp is preferably cyclopentadienyl, indenyl, tetrahydroindenyl or fluorenyl, optionally substituted as defined above. Ideally Cp is a cyclopentadienyl or indenyl.

In a suitable subgroup of the compounds of formula (I), each Cp independently bears 1, 2, 3 or 4 substituents as defined above, preferably 1, 2 or 3, such as 1 or 2 substituents, which are preferably selected from C1-C20-alkyl, C6-C20-aryl, C7-C20-arylalkyl (wherein the aryl ring alone or as a part of a further moiety may further be substituted as indicated above), —OSiR"$_3$, wherein R" is as indicated above, preferably C1-C20-alkyl.

R, if present, is preferably a methylene, ethylene or a silyl bridge, whereby the silyl can be substituted as defined above, e.g. a (dimethyl)Si=, (methylphenyl)Si=, (methyylcyclohexyl)silyl= or (trimethylsilylmethyl)Si=; n is 0 or 1. Preferably, R" is other than hydrogen.

A specific subgroup includes the well known metallocenes of Zr, Hf and Ti with two eta5-ligands which may be bridged or unbridged cyclopentadienyl ligands optionally substituted with e.g. siloxy, or alkyl (e.g. C1-6-alkyl) as defined above, or with two unbridged or bridged indenyl ligands optionally substituted in any of the ring moieties with e.g. siloxy or alkyl as defined above, e.g. at 2-, 3-, 4- and/or 7-positions. Preferred bridges are ethylene or —SiMe$_2$.

The preparation of the metallocenes can be carried out according or analogously to the methods known from the literature and is within skills of a person skilled in the field. Thus for the preparation see e.g. EP-A-129 368, examples of compounds wherein the metal atom bears a —NR"$_2$ ligand see i.a. in WO-A-9856831 and WO-A-0034341. For the preparation see also e.g. in EP-A-260 130, WO-A-9728170, WO-A-9846616, WO-A-9849208, WO-A-9912981, WO-A-9919335, WO-A-9856831, WO-A-00/34341, EP-A-423 101 and EP-A-537 130.

In a more preferred embodiment, the metallocene of the invention is described by formula (II):

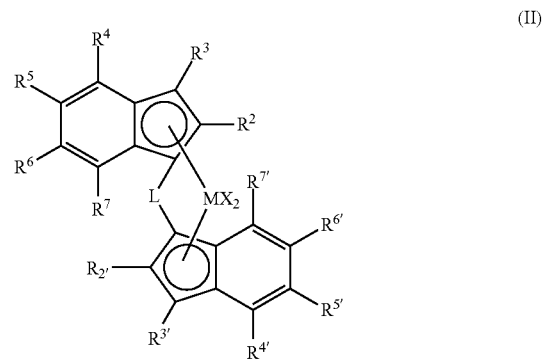

(II)

wherein

M is a group (IV) metal, especially zirconium or hafnium;

each X is a sigma ligand;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, C$_1$-C$_{20}$-hydrocarbyl (such as C$_6$-C$_{20}$-aryl, C$_7$-C$_{20}$-arylalkyl or C$_7$-C$_{20}$-alkylaryl), or tri(C$_1$-C$_{20}$-alkyl)silyl;

R$^2$ and R$^{2'}$ are each independently H, or a C$_1$-C$_{20}$ hydrocarbyl radical optionally containing one or more heteroatoms from groups 14-16;

R$^3$ and R$^{3'}$ are each independently H or a C$_1$-C$_{20}$ hydrocarbyl radical optionally containing one or more heteroatoms from groups 14-16;

R$^4$ or R$^{4'}$ are each independently an aryl or heteroaryl group having up to 20 carbon atoms optionally substituted by one or more groups R$^1$; R$^5$ and R$^{5'}$ are each independently H or a C$_{1-20}$ hydrocarbyl group optionally containing one or more heteroatoms from groups 14-16 and optionally substituted by one or more halo atoms;

R$^6$ and R$^{6'}$ are each independently hydrogen or a C$_{1-20}$ hydrocarbyl group optionally containing one or more heteroatoms from groups 14-16;

R$^7$ and R$^{7'}$ are each independently hydrogen or C$_{1-20}$ hydrocarbyl group optionally containing one or more heteroatoms from groups 14-16;

R$^1$ is a C$_{1-20}$ hydrocarbyl group or two R$^1$ groups on adjacent carbon atoms taken together can form a fused 5 or 6 membered non aromatic ring with the R$^4$ or R$^{4'}$ group, said ring being itself optionally substituted with one or more groups R$^1$;

or $R^5$ and $R^6$ and/or $R^{5'}$ and $R^{6'}$ taken together form a 4-7 membered ring condensed to the benzene ring of the indenyl moiety, said ring optionally containing heteroatoms from groups 14-16, each atom forming said ring being optionally substituted with at least one $R^1$ radical.

In the context of the compounds of formula (II), the term $C_{1-20}$ hydrocarbyl group covers any $C_{1-20}$ group comprising carbon and hydrogen only. Any $C_{1-20}$ hydrocarbyl group is preferably a $C_{1-15}$ hydrocarbyl group, more preferably a $C_{1-10}$ hydrocarbyl group, especially a $C_{1-6}$ hydrocarbyl group.

The term $C_{1-20}$ hydrocarbyl group therefore includes $C_{1-20}$ alkyl, $C_{2-20}$ alkenyl, $C_{2-20}$ alkynyl, $C_{3-20}$ cycloalkyl, $C_{3-20}$ cycloalkenyl, $C_{6-20}$ aryl groups, $C_{7-20}$ alkylaryl groups or $C_{7-20}$ arylalkyl groups.

Unless otherwise stated, preferred $C_{1-20}$ hydrocarbyl groups are $C_{1-20}$ alkyl groups or $C_{6-20}$ aryl groups, especially $C_{1-10}$ alkyl groups or $C_{6-10}$ aryl groups, e.g. $C_{1-6}$ alkyl groups. Most especially preferred hydrocarbyl groups are methyl, ethyl, propyl, isopropyl, tertbutyl, phenyl or benzyl.

The term halogen includes fluoro, chloro, bromo and iodo groups, especially chloro groups, when relating to the complex definition.

The term heteroaryl means a monocyclic aromatic ring structure comprising at least one heteroatom. Preferred heteroaryl groups have 1 to 4 heteroatoms selected from O, S and N. Preferred heteroaryl groups include furanyl, thiophenyl, oxazole, thiazole, isothiazole, isooxazole, triazole and pyridyl.

Any group including "one or more heteroatoms belonging to groups 14-16" preferably means Si, O, S or N. N groups may present as —NH— or —$NR^{11}$— where $R^{11}$ is $C_{1-10}$ alkyl. Preferably, any heteroatom is an oxygen atom. The heteroatom may form the first atom in a chain, e.g. forming an alkoxy group.

The oxidation state of the metal ion is governed primarily by the nature of the metal ion in question and the stability of the individual oxidation states of each metal ion. Typically, however the metal ions will be in the 3+ or 4+ oxidation state especially 4+.

It will be appreciated that in the complexes of the invention, the metal ion M is coordinated by ligands X so as to satisfy the valency of the metal ion and to fill its available coordination sites. The nature of these σ-ligands can vary greatly.

It is preferred if the two multicyclic ligands making up the complex of formula (II) are identical. It is also preferred if a substituent on one ring is the same as the corresponding substituent on the other. Thus, $R^2$ is preferably the same as $R^{2'}$ and so on. Preferably, the metallocene compounds of the present invention are in their racemic (rac) or racemic-antiform.

In compounds of formula (II):

M is preferably Hf or zirconium, especially Zr.

Each X, which may be the same or different, is preferably a hydrogen atom, a halogen atom, a $R^9$, $OR^9$, $OSO_2CF_3$, $OCOR^9$, $SR^9$, $NR^9_2$ or $PR^9_2$ group wherein $R^9$ is a linear or branched, cyclic or acyclic, C1-C20-alkyl, C2-C20 alkenyl, C2-C20 alkynyl, C6-C20-aryl, C7-C20-alkylaryl or C7-C20-arylalkyl radical; optionally containing heteroatoms belonging to groups 14-16 or is $SiR^9_3$, $SiHR^9_2$ or $SiH_2R^9$. $R^9$ is preferably a $C_{1-6}$ alkyl, phenyl or benzyl group.

Most preferably each X is independently a hydrogen atom, a halogen atom, $C_{1-6}$-alkoxy group or an $R^9$ group, e.g. preferably a $C_{1-6}$ alkyl, phenyl or benzyl group. Most preferably X is chlorine or a methyl radical. Preferably both X groups are the same.

L is preferably a bridge comprising one or two heteroatoms, such as silicon atom(s), e.g. —$SiR^8_2$—, wherein each $R^8$ is independently C1-C20-alkyl, C3-12 cycloalkyl, C6-C20-aryl or a tri(C1-C20-alkyl)silyl-residue, such as trimethylsilyl. More preferably $R^8$ is $C_{1-6}$-alkyl or cyclohexyl, especially methyl. L may also be an $C_{1-4}$-alkylene linkage, e.g. ethylene. Most preferably, L is a 1 or 2 atom bridge, especially a dimethylsilyl, methylcyclohexyl or ethylene bridge.

$R^2$ and $R^{2'}$ are preferably (independently) a linear or branched $C_{1-10}$-alkyl radical, like a linear or branched $C_{1-6}$-alkyl radical. $R^1$ is ideally linear $C_{1-6}$ alkyl radical, preferably a methyl or ethyl radical.

Alternatively, each $R^2$ and $R^{2'}$ is a $C_4$-$C_{10}$ hydrocarbyl radical branched at the β-atom to the cyclopentadienyl ring, optionally containing one or more heteroatoms belonging to groups 14-16, or is a C3-C20 hydrocarbyl radical branched at the β-atom to the cyclopentadienyl ring where the β-atom is an Si-atom. Ideally in this embodiment, each $R^2$ and $R^{2'}$ is a $C_{4-10}$ beta branched alkyl group such as an isobutyl group.

$R^3$ and $R^{3'}$ are preferably H.

$R^4$ and $R^{4'}$ are preferably an optionally substituted phenyl group. The phenyl group may comprise 1, 2 or 3 substituents, preferably 0, 1 or 2 substituents, e.g. $C_{1-6}$ alkyl groups. Highly preferably therefore the $R^1$ substituent on the phenyl ring is a linear or branched $C_{4-6}$alkyl group, e.g. tert butyl.

Preferably that substituent is carried para to the bond to the indenyl ring where only one substituent is present. If two substituents are present on the phenyl ring they are preferably situated 3,5 on the Ph ring (i.e. both meta to the indenyl) such as 3,5-ditertbutylphenyl.

$R^5$ and $R^{5'}$ are preferably H, $OC_{1-20}$ alkyl, Ph or $C_{1-20}$ alkyl group, more preferably H, $OC_{1-10}$ alkyl or $C_{1-10}$ alkyl group, such as H, $OC_{1-6}$ alkyl or $C_{1-6}$ alkyl group. If one of $R^5$ or $R^{5'}$ is H, it is preferred that the other is not H. $R^{5'}$ is preferably H.

$R^6$ and $R^{6'}$ are preferably are H, $C_{1-10}$ alkyl, such as $C_{4-10}$ branched alkyl, or a cycloalkyl optionally substituted with alkyl having up to 10 carbon atoms. Preferred options are tert-butyl, 1-alkylcyclopentyl or 1-alkylcyclohexyl. If one of $R^6$ or $R^{6'}$ is H, it is preferred that the other is not H.

In one embodiment the metallocenes of the invention are asymmetic. In one embodiment both $R^{5'}$ and $R^6$ are H and $R^5$ and $R^6$ are not H or $R^{5'}$ is H and $R^5$, $R^{6'}$ and $R^6$ are not H.

Alternatively, $R^5$ and $R^6$ or $R^{5'}$ and $R^6$ taken together form a 5 or 6 membered ring, such as a 5-membered ring, which is optionally substituted by one or two $C_{1-6}$alkyl groups, preferably unsubstitued.

$R^7$ and $R^{7'}$ are preferably H, $OC_{1-6}$ alkyl or $C_{1-4}$ alkyl, ideally H.

Thus, further preferred metallocenes are of formula (III)

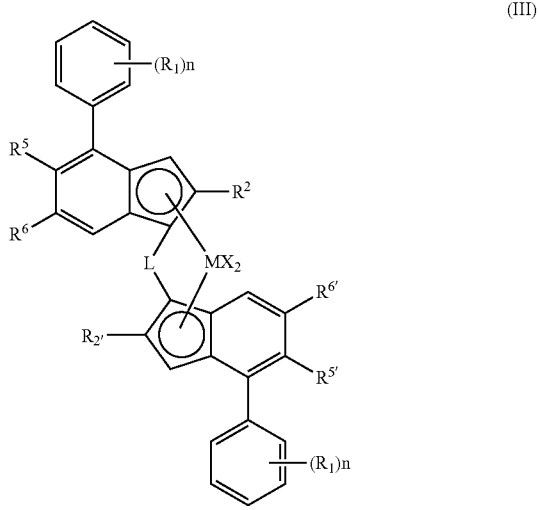

wherein M is Hf or Zr;

each X is independently a hydrogen atom, a halogen atom, $C_{1-6}$ alkoxy group, $C_{1-6}$ alkyl, phenyl or benzyl group;

L is a divalent bridge selected from —R'$_2$C— or —R'$_2$Si— wherein each R' is independently a hydrogen atom, $C_{1-20}$ alkyl or $C_{3-10}$ cycloalkyl;

$R^2$ and $R^{2'}$ are each independently H, a linear $C_1$-$C_6$ alkyl or branched $C_{4-10}$-alkyl, especially methyl or isobutyl;

n is independently 0, 1 or 2;

$R^1$ is independently $C_{1-6}$ alkyl group;

$R^5$ and $R^{5'}$ are each independently H, phenyl, a $C_{1-10}$ alkyl group or $OC_{1-10}$alkyl group;

$R^6$ and $R^{6'}$ are each independently hydrogen or a $C_{1-10}$ alkyl group; or $R^5$ and $R^6$ and/or $R^{5'}$ and $R^{6'}$ taken together form a 5-6 membered ring condensed to the benzene ring of the indenyl moiety being optionally substituted with one $R_1$ radical.

In a still more preferred embodiment, the metallocene complex is of formula (IV)

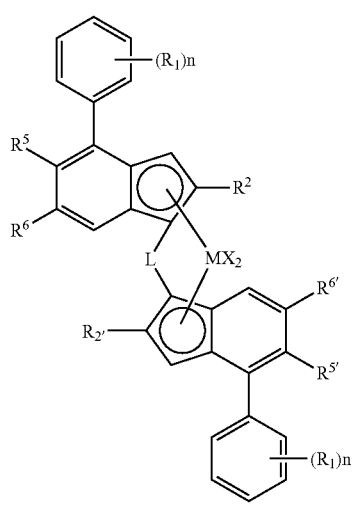

(IV)

wherein M is Hf or Zr;

each X is independently a hydrogen atom, a halogen atom, $C_{1-6}$ alkoxy group, $C_{1-6}$ alkyl, phenyl or benzyl group;

L is a divalent bridge selected from —R'$_2$C— or —R'$_2$Si— wherein each R' is independently a hydrogen atom, $C_{1-20}$ alkyl or $C_{3-10}$ cycloalkyl;

$R^2$ and $R^{2'}$ are each independently $C_{1-6}$ alkyl such as methyl;

n is independently 0, 1 or 2;

$R^1$ is independently $C_{3-6}$ alkyl group;

$R^5$ and $R^{5'}$ are each independently H, a $C_{1-6}$ alkyl group or $OC_{1-6}$alkyl group;

$R^6$ and $R^{6'}$ are each independently a H, a $C_{1-6}$alkyl group; or $R^5$ and $R^6$ and/or $R^{5'}$ and $R^6$ taken together form an unsubstituted 5 membered ring condensed to the benzene ring of the indenyl moiety.

Particularly preferred metallocenes include those of WO2002/002576, WO2011/135004, WO2012/084961, WO2012/001052 or WO2011/076780 or WO2006/060544, such as f rac-cyclohexyl(methyl)silanediylbis[2-methyl-4-(4'-tert-butylphenyl)indenyl]zirconium dichloride or bridged 2-methyl-4-phenylindenyl ligands.

Synthesis

The ligands required to form the catalysts of the invention can be synthesised by any process and the skilled organic chemist would be able to devise various synthetic protocols for the manufacture of the necessary ligand materials. WO2007/116034 discloses the necessary chemistry and is herein incorporated by reference. Synthetic protocols can also generally be found in WO200202576, WO2011/135004, WO2012/084961, WO2012/001052 and WO2011/076780.

For example, the following general synthetic scheme can be used to synthesise some asymmetric complexes of the invention:

Scheme 1

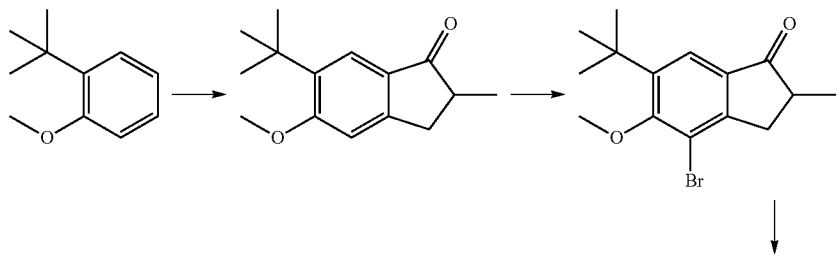

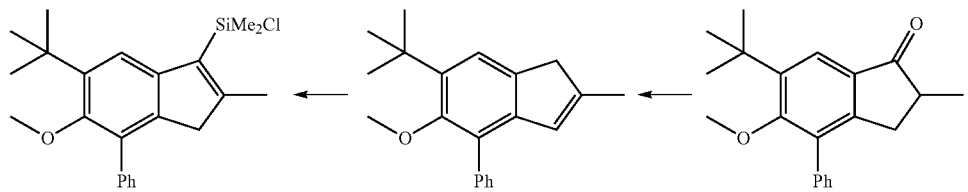

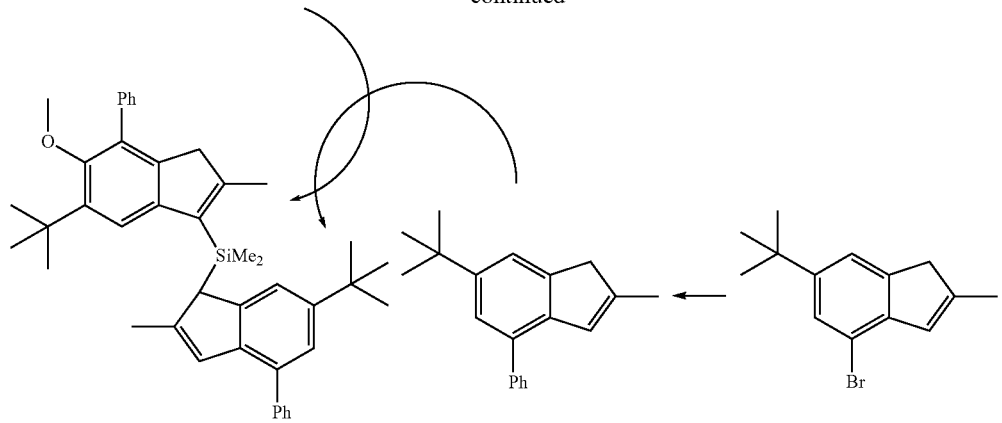

Cocatalyst

To form an active catalytic species it is normally necessary to employ a cocatalyst as is well known in the art. The present invention requires the use of both an aluminoxane cocatalyst and a boron containing cocatalyst.

The aluminoxane cocatalyst can be one of formula:

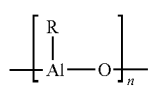

(I)

where n is usually from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, C1-C10 alkyl, preferably C1-05 alkyl, or C3-10-cycloalkyl, C7-C12-aralkyl or alkaryl and/or phenyl or naphthyl, and where Y can be hydrogen, halogen, preferably chlorine or bromine, or C1-C10 alkoxy, preferably methoxy or ethoxy. The resulting oxygen-containing aluminoxanes are not in general pure compounds but mixtures of oligomers of the formula (I).

The preferred aluminoxane in the process according to the invention is methylaluminoxane (MAO). Since the aluminoxanes used according to the invention as cocatalysts are not, owing to their mode of preparation, pure compounds, the molarity of aluminoxane solutions hereinafter is based on their aluminium content.

It has been surprisingly found however, that in the context of heterogeneous catalysis, where catalysts are not supported on any external carrier or supported as described above, that higher activities can be achieved if a boron based cocatalyst is also employed as a cocatalyst. It will be appreciated by the skilled man that where boron based cocatalysts are employed, it is normal to preactivate the complex by reaction thereof with an aluminium alkyl compound, such as TIBA. This procedure is well known and any suitable aluminium alkyl, e.g. $Al(C_{1-6}\text{-alkyl})_3$ can be used.

The present invention combines the use of boron cocatalysts with aluminoxanes rather than the combination of these simple aluminium alkyls and boron cocatalysts.

Boron based cocatalysts of interest include boron compounds containing a borate 3+ ion, i.e. borate compounds. These compounds generally contain an anion of formula (V):

$(Z)_4B^-$  (V)

where Z is an optionally substituted phenyl derivative, said substituent being a $C_{1-6}$ alkyl group, $haloC_{1-6}$-alkyl or halo group. Preferred options are methyl, fluoro or trifluoromethyl. Most preferably, the phenyl group is perfluorinated or unsubstituted.

Such ionic cocatalysts preferably contain a non-coordinating anion such as tetrakis(pentafluorophenyl)borate and tetraphenylborate.

Suitable counterions are protonated amine or aniline derivatives or phosphonium ions. These may have the general formula (VI) or (VII):

$NQ_4^+$  (VI) or $PQ_4^+$  (VII)

where Q is independently H, $C_{1-6}$-alkyl, $C_{3-8}$ cycloakyl, $phenylC_{1-6}$-alkylene- or optionally substituted Ph. Optional substituents may be C1-6-alkyl, halo or nitro. There may be one or more than one such substituent. Preferred substituted Ph groups include therefore para-substituted phenyl, preferably p-Br-phenyl or p-nitrophenyl, tolyl or dimethylphenyl.

It is preferred if at least one Q group is H, thus preferred compounds are those of formula:

$NHQ_3^+$  (VI') or $PHQ_3^+$  (VII')

Preferred $phenylC_{1-6}$-alkyl-groups include benzyl.

Suitable counterions therefore include: methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, p-bromo-N,N-dimethylanilinium or p-nitro-N,N-dimethylanilinium, especially dimethylammonium or N,N-dimethylanilinium. The use of pyridinium as an ion is a further option.

Phosphonium ions of interest include triphenylphosphonium, triethylphosphonium, diphenylphosphonium, tri(methylphenyl)phosphonium and tri(dimethylphenyl)phosphonium A more preferred counterion is trityl ($CPh_3^+$) or analogues thereof in which the Ph group is functionalised to carry one or more alkyl groups.

Highly preferred borates of use in the invention therefore comprise the tetrakis(pentafluorophenyl)borate ion.

Preferred ionic compounds which can be used according to the present invention include: triethylammoniumtetra(phenyl)borate, tributylammoniumtetra(phenyl)borate, trimethylammoniumtetra(tolyl)borate, tributylammoniumtetra(tolyl)borate, tributylammoniumtetra(pentafluorophenyl)borate, tripropylammoniumtetra(dimethylphenyl)borate, tributylammoniumtetra(trifluoromethylphenyl)borate, tributylammoniumtetra(4-fluorophenyl)borate, N,N-dimethylcyclohexylammoniumtetrakis(pentafluorophenyl)borate, N,N-dimethylbenzylammoniumtetrakis(pentafluorophenyl)borate, N,N-dimethylaniliniumtetra(phenyl)borate, N,N-diethylaniliniumtetra(phenyl)borate, N,N-dimethylaniliniumtetrakis(pentafluorophenyl)borate, N,N-di(propyl)ammoniumtetrakis(pentafluorophenyl)borate, di(cyclohexyl)ammoniumtetrakis(pentafluorophenyl)borate, triphenylcarbeniumtetrakis(pentafluorophenyl)borate, triphenylphosphoniumtetrakis(phenyl)borate, triethylphosphoniumtetrakis(phenyl)borate, diphenylphosphoniumtetrakis(phenyl)borate, tri(methylphenyl)phosphoniumtetrakis(phenyl)borate, tri(dimethylphenyl)phosphoniumtetrakis(phenyl)borate, or ferroceniumtetrakis(pentafluorophenyl)borate.

Preference is given to triphenylcarbeniumtetrakis(pentafluorophenyl) borate, N,N-dimethylcyclohexylammoniumtetrakis(pentafluorophenyl)borate, N,N-dimethylbenzylammoniumtetrakis(pentafluorophenyl)borate or (N,N-dimethylaniliniumtetrakis(pentafluorophenyl)borate).

It has been surprisingly found that certain boron cocatalysts are especially preferred. Preferred borates of use in the invention therefore comprise the trityl ion. Thus the use of N,N-dimethylammonium-tetrakispentafluorophenylborate and $Ph_3CB(PhF_5)_4$ and analogues therefore are favoured over, Suitable amounts of cocatalyst will be well known to the skilled man.

The ratio of boron to the metal ion of the metallocene in the feed may be in the range 1:10 to 10:1 mol/mol, preferably 1:5 to 5:1, especially 1:5 to 2:1 mol/mol.

The ratio of Al in the aluminoxane to the metal ion of the metallocene may be in the range 1:1 to 1200:1 mol/mol, preferably 1:1 to 500:1, especially 1:1 to 250:1 mol/mol.

Catalyst Manufacture

The metallocene complex of the present invention is used in combination with the cocatalysts as a catalyst for the polymerization of olefins. The catalyst of the invention is in solid, preferably in unsupported form. Thus, no external carrier is used but the catalyst is still presented in solid particulate form. Thus no external support material such as inert organic or inorganic carrier, such as for example silica is employed.

In order to provide the catalyst of the invention in solid form but without using an external carrier, it is preferred if a liquid/liquid emulsion system is used. The process involves forming dispersing catalyst components (i) (the complex) and (ii)+(iii) (the cocatalysts) in a solvent, and solidifying said dispersed droplets to form solid particles.

In the present case, it is particularly preferred if the aluminoxane is contacted with the metallocene before the borate is added. Both cocatalyst components and the metallocene are preferably present in one solution.

In particular, the method involves preparing a solution of the catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined particle size, spherical shape, compact structure, excellent surface properties and without using any added external porous support material, such as an inorganic oxide, e.g. silica. The catalyst particles can have a smooth surface, they may be compact in nature and catalyst active components can be distributed uniformly thorough the catalyst particles.

The catalyst forming compounds may be combined in one solution which is dispersed to the immiscible solvent, or, alternatively, at least two separate catalyst solutions for each part of the catalyst forming compounds may be prepared, which are then dispersed successively to the solvent.

In a preferred method for forming the catalyst at least two separate solutions for each or part of said catalyst may be prepared, which are then dispersed successively to the immiscible solvent.

More preferably, a solution of the complex comprising the transition metal compound and the cocatalysts is combined with the solvent to form an emulsion wherein that inert solvent forms the continuous liquid phase and the solution comprising the catalyst components forms the dispersed phase (discontinuous phase) in the form of dispersed droplets. The droplets are then solidified to form solid catalyst particles, and the solid particles are separated from the liquid and optionally washed and/or dried. The solvent forming the continuous phase may be immiscible to the catalyst solution at least at the conditions (e. g. temperatures) used during the dispersing step.

The term "immiscible with the catalyst solution" means that the solvent (continuous phase) is fully immiscible or partly immiscible i.e. not fully miscible with the dispersed phase solution.

Preferably said solvent is inert in relation to the compounds of the catalyst system to be produced. Full disclosure of the necessary process can be found in WO03/051934 which is herein incorporated by reference.

The inert solvent must be chemically inert at least at the conditions (e.g. temperature) used during the dispersing step. Preferably, the solvent of said continuous phase does not contain dissolved therein any significant amounts of catalyst forming compounds. Thus, the solid particles of the catalyst are formed in the droplets from the compounds which originate from the dispersed phase (i.e. are provided to the emulsion in a solution dispersed into the continuous phase).

The terms "immobilisation" and "solidification" are used herein interchangeably for the same purpose, i.e. for forming free flowing solid catalyst particles in the absence of an external porous particulate carrier, such as silica. The solidification happens thus within the droplets. Said step can be effected in various ways as disclosed in said WO03/051934 Preferably solidification is caused by an external stimulus to the emulsion system such as a temperature change to cause the solidification. Thus in said step the catalyst component (s) remain "fixed" within the formed solid particles. It is also possible that one or more of the catalyst components may take part in the solidification/immobilisation reaction.

Accordingly, solid, compositionally uniform particles having a predetermined particle size range can be obtained. Furthermore, the particle size of the catalyst particles of the invention can be controlled by the size of the droplets in the solution, and spherical particles with a uniform particle size distribution can be obtained.

The invention is also industrially advantageous, since it enables the preparation of the solid particles to be carried out as a one-pot procedure. Continuous or semicontinuous processes are also possible for producing the catalyst.

Dispersed Phase

The principles for preparing two phase emulsion systems are known in the chemical field. Thus, in order to form the two phase liquid system, the solution of the catalyst component (s) and the solvent used as the continuous liquid phase have to be essentially immiscible at least during the dispersing step. This can be achieved in a known manner e.g. by choosing said two liquids and/or the temperature of the dispersing step/solidifying step accordingly.

A solvent may be employed to form the solution of the catalyst component (s). Said solvent is chosen so that it dissolves said catalyst component (s). The solvent can be preferably an organic solvent such as used in the field, comprising an optionally substituted hydrocarbon such as linear or branched aliphatic, alicyclic or aromatic hydrocarbon, such as a linear or cyclic alkane, an aromatic hydrocarbon and/or a halogen containing hydrocarbon.

Examples of aromatic hydrocarbons are toluene, benzene, ethylbenzene, propylbenzene, butylbenzene and xylene. Toluene is a preferred solvent. The solution may comprise one or more solvents. Such a solvent can thus be used to facilitate the emulsion formation, and usually does not form part of the solidified particles, but e.g. is removed after the solidification step together with the continuous phase.

Alternatively, a solvent may take part in the solidification, e.g. an inert hydrocarbon having a high melting point (waxes), such as above 40° C., suitably above 70° C., e. g. above 80° C. or 90° C., may be used as solvents of the dispersed phase to immobilise the catalyst compounds within the formed droplets.

In another embodiment, the solvent consists partly or completely of a liquid monomer, e.g. liquid olefin monomer designed to be polymerised in a "prepolymerisation" immobilisation step.

Continuous Phase

The solvent used to form the continuous liquid phase is a single solvent or a mixture of different solvents and may be immiscible with the solution of the catalyst components at least at the conditions (e.g. temperatures) used during the dispersing step. Preferably said solvent is inert in relation to said compounds.

The term "inert in relation to said compounds" means herein that the solvent of the continuous phase is chemically inert, i.e. undergoes no chemical reaction with any catalyst forming component. Thus, the solid particles of the catalyst are formed in the droplets from the compounds which originate from the dispersed phase, i.e. are provided to the emulsion in a solution dispersed into the continuous phase.

It is preferred that the catalyst components used for forming the solid catalyst will not be soluble in the solvent of the continuous liquid phase. Preferably, said catalyst components are essentially insoluble in said continuous phase forming solvent.

Solidification takes place essentially after the droplets are formed, i.e. the solidification is effected within the droplets e.g. by causing a solidifying reaction among the compounds present in the droplets. Furthermore, even if some solidifying agent is added to the system separately, it reacts within the droplet phase and no catalyst forming components go into the continuous phase.

The term "emulsion" used herein covers both bi- and multiphasic systems.

In a preferred embodiment said solvent forming the continuous phase is an inert solvent including a halogenated organic solvent or mixtures thereof, preferably fluorinated organic solvents and particularly semi, highly or perfluorinated organic solvents and functionalised derivatives thereof. Examples of the above-mentioned solvents are semi, highly or perfluorinated hydrocarbons, such as alkanes, alkenes and cycloalkanes, ethers, e.g. perfluorinated ethers and amines, particularly tertiary amines, and functionalised derivatives thereof. Preferred are semi, highly or perfluorinated, particularly perfluorinated hydrocarbons, e.g. perfluorohydrocarbons of e.g. C3-C30, such as C4-C10. Specific examples of suitable perfluoroalkanes and perfluorocycloalkanes include perfluoro-hexane, -heptane, -octane and -(methylcyclohexane). Semi fluorinated hydrocarbons relates particularly to semifluorinated n-alkanes, such as perfluoroalkyl-alkane.

"Semi fluorinated" hydrocarbons also include such hydrocarbons wherein blocks of —C—F and —C—H alternate. "Highly fluorinated" means that the majority of the —C—H units are replaced with —C—F units. "Perfluorinated" means that all —C—H units are replaced with —C—F units. See the articles of A. Enders and G. Maas in "Chemie in unserer Zeit", 34. Jahrg. 2000, Nr. 6, and of Pierandrea Lo Nostro in "Advances in Colloid and Interface Science", 56 (1995) 245-287, Elsevier Science.

Dispersing Step

The emulsion can be formed by any means known in the art: by mixing, such as by stirring said solution vigorously to said solvent forming the continuous phase or by means of mixing mills, or by means of ultra sonic wave, or by using a so called phase change method for preparing the emulsion by first forming a homogeneous system which is then transferred by changing the temperature of the system to a biphasic system so that droplets will be formed.

The two phase state is maintained during the emulsion formation step and the solidification step, as, for example, by appropriate stirring.

Additionally, emulsifying agents/emulsion stabilisers can be used, preferably in a manner known in the art, for facilitating the formation and/or stability of the emulsion. For the said purposes e.g. surfactants, e.g. a class based on hydrocarbons (including polymeric hydrocarbons with a molecular weight e.g. up to 10 000 and optionally interrupted with a heteroatom(s)), preferably halogenated hydrocarbons, such as semi- or highly fluorinated hydrocarbons optionally having a functional group selected e.g. from —OH, —SH, $NH_2$, $NR''_2$. —COOH, —$COONH_2$, oxides of alkenes, —CR''=$CH_2$, where R" is hydrogen, or C1-C20 alkyl, C2-20-alkenyl or C2-20-alkynyl group, oxo-groups, cyclic ethers and/or any reactive derivative of these groups, like alkoxy, or carboxylic acid alkyl ester groups, or, preferably semi-, highly- or perfluorinated hydrocarbons having a functionalised terminal, can be used. The surfactants can be added to the catalyst solution, which forms the dispersed phase of the emulsion, to facilitate the forming of the emulsion and to stabilize the emulsion.

Alternatively, an emulsifying and/or emulsion stabilising aid can also be formed by reacting a surfactant precursor bearing at least one functional group with a compound reactive with said functional group and present in the catalyst solution or in the solvent forming the continuous phase. The obtained reaction product acts as the actual emulsifying aid and or stabiliser in the formed emulsion system.

Examples of the surfactant precursors usable for forming said reaction product include e.g. known surfactants which bear at least one functional group selected e.g. from —OH, —SH, NH$_2$, NR"$_2$. —COOH, —COONH$_2$, oxides of alkenes, —CR"=CH$_2$, where R" is hydrogen, or C1-C20 alkyl, C2-20-alkenyl or C2-20-alkynyl group, oxo-groups, cyclic ethers with 3 to 5 ring atoms, and/or any reactive derivative of these groups, like alkoxy or carboxylic acid alkyl ester groups; e.g. semi-, highly or perfluorinated hydrocarbons bearing one or more of said functional groups. Preferably, the surfactant precursor has a terminal functionality as defined above.

The compound reacting with such surfactant precursor is preferably contained in the catalyst solution and may be a further additive or one or more of the catalyst forming compounds. Such compound is e.g. a compound of group 13 (e.g. MAO and/or an aluminium alkyl compound and/or a transition metal compound).

If a surfactant precursor is used, it is preferably first reacted with a compound of the catalyst solution before the addition of the transition metal compound. In one embodiment e.g. a highly fluorinated C1-n (suitably C4-30- or C5-15) alcohol (e.g. highly fluorinated heptanol, octanol or nonanol), oxide (e.g. propenoxide) or acrylate ester is reacted with a cocatalyst to form the "actual" surfactant. Then, an additional amount of cocatalyst and the transition metal compound is added to said solution and the obtained solution is dispersed to the solvent forming the continuous phase. The "actual" surfactant solution may be prepared before the dispersing step or in the dispersed system. If said solution is made before the dispersing step, then the prepared "actual" surfactant solution and the transition metal solution may be dispersed successively (e. g. the surfactant solution first) to the immiscible solvent, or be combined together before the dispersing step.

Solidification

The solidification of the catalyst component(s) in the dispersed droplets can be effected in various ways, e.g. by causing or accelerating the formation of said solid catalyst forming reaction products of the compounds present in the droplets. This can be effected, depending on the used compounds and/or the desired solidification rate, with or without an external stimulus, such as a temperature change of the system.

In a particularly preferred embodiment, the solidification is effected after the emulsion system is formed by subjecting the system to an external stimulus, such as a temperature change. Temperature differences of e.g. 5 to 100° C., such as 10 to 100° C., or 20 to 90° C., such as 50 to 90° C.

The emulsion system may be subjected to a rapid temperature change to cause a fast solidification in the dispersed system. The dispersed phase may e. g. be subjected to an immediate (within milliseconds to few seconds) temperature change in order to achieve an instant solidification of the component (s) within the droplets. The appropriate temperature change, i. e. an increase or a decrease in the temperature of an emulsion system, required for the desired solidification rate of the components cannot be limited to any specific range, but naturally depends on the emulsion system, i.a. on the used compounds and the concentrations/ratios thereof, as well as on the used solvents, and is chosen accordingly. It is also evident that any techniques may be used to provide sufficient heating or cooling effect to the dispersed system to cause the desired solidification.

In one embodiment the heating or cooling effect is obtained by bringing the emulsion system with a certain temperature to an inert receiving medium with significantly different temperature, e. g. as stated above, whereby said temperature change of the emulsion system is sufficient to cause the rapid solidification of the droplets. The receiving medium can be gaseous, e. g. air, or a liquid, preferably a solvent, or a mixture of two or more solvents, wherein the catalyst component (s) is (are) immiscible and which is inert in relation to the catalyst component (s). For instance, the receiving medium comprises the same immiscible solvent used as the continuous phase in the first emulsion formation step.

Said solvents can be used alone or as a mixture with other solvents, such as aliphatic or aromatic hydrocarbons, such as alkanes. Preferably a fluorinated solvent as the receiving medium is used, which may be the same as the continuous phase in the emulsion formation, e. g. perfluorinated hydrocarbon.

Alternatively, the temperature difference may be effected by gradual heating of the emulsion system, e. g. up to 10° C. per minute, preferably 0.5 to 6° C. per minute and more preferably in 1 to 5° C. per minute.

In case a melt of e. g. a hydrocarbon solvent is used for forming the dispersed phase, the solidification of the droplets may be effected by cooling the system using the temperature difference stated above.

Preferably, the "one phase" change as usable for forming an emulsion can also be utilised for solidifying the catalytically active contents within the droplets of an emulsion system by, again, effecting a temperature change in the dispersed system, whereby the solvent used in the droplets becomes miscible with the continuous phase, preferably a fluorous continuous phase as defined above, so that the droplets become impoverished of the solvent and the solidifying components remaining in the "droplets" start to solidify. Thus the immisciblity can be adjusted with respect to the solvents and conditions (temperature) to control the solidification step.

The miscibility of e.g. organic solvents with fluorous solvents can be found from the literature and be chosen accordingly by a skilled person. Also the critical temperatures needed for the phase change are available from the literature or can be determined using methods known in the art, e. g. the Hildebrand-Scatchard-Theorie. Reference is also made to the articles of A. Enders and G. and of Pierandrea Lo Nostro cited above.

Thus according to the invention, the entire or only part of the droplet may be converted to a solid form. The size of the "solidified" droplet may be smaller or greater than that of the original droplet, e. g. if the amount of the monomer used for the prepolymerisation is relatively large.

The solid catalyst particles recovered can be used, after an optional washing step, in a polymerisation process of an olefin. Alternatively, the separated and optionally washed solid particles can be dried to remove any solvent present in the particles before use in the polymerisation step. The separation and optional washing steps can be effected in a known manner, e. g. by filtration and subsequent washing of the solids with a suitable solvent.

The droplet shape of the particles may be substantially maintained. The formed particles may have an average size range of 1 to 500 μm, e.g. 5 to 500 μm, advantageously 5 to 200 μm or 10 to 150 μm. Even an average size range of 5 to 60 μm is possible. The size may be chosen depending on the polymerisation the catalyst is used for. Advantageously, the particles are essentially spherical in shape, they have a low porosity and a low surface area.

The formation of solution can be effected at a temperature of 0-100° C., e.g. at 20-80° C. The dispersion step may be effected at −20° C.-100° C., e.g. at about −10-70° C., such as at −5 to 30° C., e.g. around 0° C.

To the obtained dispersion an emulsifying agent as defined above, may be added to improve/stabilise the droplet formation. The solidification of the catalyst component in the droplets is preferably effected by raising the temperature of the mixture, e.g. from 0° C. temperature up to 100° C., e.g. up to 60-90° C., gradually. E.g. in 1 to 180 minutes, e.g. 1-90 or 5-30 minutes, or as a rapid heat change. Heating time is dependent on the size of the reactor.

During the solidification step, which is preferably carried out at about 60 to 100° C., preferably at about 75 to 95° C., (below the boiling point of the solvents) the solvents may preferably be removed and optionally the solids are washed with a wash solution, which can be any solvent or mixture of solvents such as those defined above and/or used in the art, preferably a hydrocarbon, such as pentane, hexane or heptane, suitably heptane. The washed catalyst can be dried or it can be slurried into an oil and used as a catalyst-oil slurry in polymerisation process.

All or part of the preparation steps can be done in a continuous manner. Reference is made to WO2006/069733 describing principles of such a continuous or semicontinuous preparation methods of the solid catalyst types, prepared via emulsion/solidification method.

The formed catalyst preferably has good stability/kinetics in terms of longevity of reaction, high activity and the catalysts enable low ash contents.

Activities of 50 kg polymer per g catalysts/h can be achieved, preferably at least 60 kg polymer per g/h.

Catalyst kinetics are also good. Catalysts should have at least a 30 minute period without any drop off in performance, preferably at least 1 h.

Catalyst Preparation/Prepolymerisation

The use of the heterogeneous, non-supported catalysts, (i.e. "self-supported" catalysts) might have, as a drawback, a tendency to dissolve to some extent in the polymerisation media, i.e. some active catalyst components might leach out of the catalyst particles during slurry polymerisation, whereby the original good morphology of the catalyst might be lost. These leached catalyst components are very active possibly causing problems during polymerisation. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerisation which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is preferred to "prepolymerise" the catalyst before using it in polymerisation process. It has to be noted that prepolymerisation in this regard is part of the catalyst preparation process, being a step carried out after a solid catalyst is formed. This catalyst prepolymerisation step is not part of the actual polymerisation configuration, which might comprise a conventional process prepolymerisation step as well. After therefore the catalyst prepolymerisation step, a solid catalyst is obtained and used in polymerisation.

Catalyst "prepolymerisation" takes place following the solidification step of the liquid-liquid emulsion process hereinbefore described. Prepolymerisation may take place by known methods described in the art, such as that described in WO 2010/052263, WO 2010/052260 or WO 2010/052264. Preferable embodiments of this aspect of the invention are described herein.

As monomers in the catalyst prepolymerisation step preferably alpha-olefins are used. Preferable $C_2$-$C_{10}$ olefins, such as ethylene, propylene, 1-butene, 1-pentene, 1-hexene, 4-methyl-1-pentene, 1-heptene, 1-octene, 1-nonene 1-decene, styrene and vinylcyclohexene are used. Most preferred alpha-olefins are ethylene and propylene. The catalyst prepolymerisation may be carried out in gas phase or in an inert diluent, typically oil or fluorinated hydrocarbon, preferably in fluorinated hydrocarbons or mixture of fluorinated hydrocarbons. Preferably perfluorinated hydrocarbons are used. The melting point of such (per)fluorinated hydrocarbons is typically in the range of 0 to 140° C., preferably 30 to 120° C., like 50 to 110° C.

Where the catalyst prepolymerisation is done in fluorinated hydrocarbons, the temperature for the prepolymerisation step is below 70° C., e.g. in the range of −30 to 70° C., preferably 0-65° C. and more preferably in the range 20 to 55° C.

Pressure within the prepolymerisation vessel is preferably higher than atmospheric pressure to minimize the eventual leaching of air and/or moisture into the catalyst vessel. Preferably the pressure is in the range of at least 1 to 15 bar, preferably 2 to 10 bar. The prepolymerisation vessel is preferably kept in an inert atmosphere, such as under nitrogen or argon or similar atmosphere.

Prepolymeristaion is continued until the prepolymerisation degree defined as weight of polymer matrix/weight of solid catalyst before prepolymerisation step is reached. The degree is below 25, preferably 0.5 to 10.0, more preferably 1.0 to 8.0, most preferably 2.0 to 6.0.

Use of the catalyst prepolymerisation step offers the advantage of minimising leakage of catalyst components and thus local overheating. After prepolymerisation, the catalyst can be isolated and stored. It will be appreciated that this catalyst can be used to form a propylene homopolymer even if a non propylene monomer is used in the catalyst preparation step. It is preferred however, if propylene is used in the prepolymerisation step.

Polymerisation

The olefin polymerized using the catalyst of the invention is propylene, In particular, the formed polymer is a propylene homopolymer. Most especially, the catalyst is used to manufacture isotactic polypropylene. It has been found that by manipulation of the nature or amount of the boron compound, we can increase the melting point of the forming propylene homopolymer.

Polymerization in the method of the invention may be effected in one or more, e.g. 1, 2 or 3, polymerization reactors, ideally one, using conventional polymerization techniques, e.g. gas phase, slurry or bulk polymerization. Polymerisations are heterogeneous as the catalyst does not dissolve in the reaction medium.

In general, a combination of slurry (or bulk) and at least one gas phase reactor is often preferred, particularly with the reactor order being slurry (or bulk) then one or more gas phase reactors.

In case of propylene polymerisation for slurry reactors, the reaction temperature will generally be in the range 60 to 110° C. (e.g. 60-90° C.), the reactor pressure will generally be in the range 5 to 80 bar (e.g. 20-60 bar), and the residence time will generally be in the range 0.1 to 5 hours (e.g. 0.3 to 2 hours). The monomer is usually used as reaction medium.

For gas phase reactors, the reaction temperature used will generally be in the range 60 to 115° C. (e.g. 70 to 110° C.), the reactor pressure will generally be in the range 10 to 25 bar, and the residence time will generally be 0.5 to 8 hours (e.g. 0.5 to 4 hours). The gas used will be the monomer optionally as mixture with a non-reactive gas such as nitrogen or propane. In addition to actual polymerisation steps and reactors, the process can contain any additional polymerisation steps, like prepolymerisation step, and any further after reactor handling steps as known in the art.

Generally the quantity of catalyst used will depend upon the nature of the catalyst, the reactor types and conditions and the properties desired for the polymer product. As is well known in the art hydrogen can be used for controlling the molecular weight of the polymer.

It is a feature of the invention that the claimed catalysts enable the formation of polymers with remarkably high melting points with high catalyst activities.

These features can be achieved at commercially interesting polymerisation temperatures, e.g. 60° C. or more. It is a preferred feature of the invention that the catalysts of the invention are used to polymerise propylene at a temperature of at least 60° C., preferably at least 65° C., such as at least 70° C.

Melting points of polypropylene homopolymers made by the process of the invention can be 152.5° C. or more, such as 153° C. or more, especially 154° C. or more. The melting point of polypropylene can be increased from 149-152° C. using aluminoxanes alone up to 154-157° C. (using both cocatalysts). Melting points can therefore be increased by a remarkable 4 to 7° C. depending on basic reference polymer properties.

The presence of the boron and aluminoxane cocatalysts has also been observed to reduce MFR. In our examples we demonstrate that $MFR_2$ reduces by around 7 to 8 g/10 min when both cocatalysts are used relative to the use of MAO alone.

The presence of two cocatalysts does not however affect the overall crystallinity of the polymer.

Moreover, these advantages are achieved at higher catalyst activity. We observe increases of more than 6%, even 20% or more in activity relative to experiments carried out in the presence of MAO alone. In some cases activity was even doubled by using two cocatalysts.

Polypropylenes made by the metallocenes of the invention can be made with $MFR_2$ values in the whole range of interest, that is from very high (as high as 2000, for example 1000 or 500 g/10 min) to very low, that is fractional values (<1). Hydrogen can be used to manipulate MFR as is well known. Values of $MFR_2$ of 1 to 30 such as 5 to 20 g/10 min are typical values for many applications. These values may be reduced by around 4 to 10 g/10 min relative to otherwise identical polymers produced in the absence of the boron cocatalyst. However, as is well known, different applications may need polymer with very low $MFR_2$ values or very high $MFR_2$ values.

Applications

The polymers made by the catalysts of the invention are useful in all kinds of end articles such as pipes, films (cast, blown or BOPP films, such as for example BOPP for capacitor film), fibers, moulded articles (e.g. injection moulded, blow moulded, rotomoulded articles), extrusion coatings and so on.

The invention will now be illustrated by reference to the following non-limiting examples.

EXAMPLES

Chemicals

All the chemicals and chemical reactions were handled under an inert gas atmosphere using Schlenk and glovebox techniques, with oven-dried glassware, syringes, needles or cannulas.

MAO was purchased from Albermarle and used as a 30 wt-% solution in toluene.

The mixture of perfluoroalkylethyl acrylate esters (CAS 65605-70-1) used as the surfactant was purchased from the Cytonix corporation, dried over activated molecular sieves (2 times) and degassed by argon bubbling prior to use.

Perfluoro-1,3-dimethylcyclohexane (PFC, CAS 335-27-3) was dried over activated molecular sieves (2 times) and degassed by argon bubbling prior to use.

Triethylaluminum was purchased from Crompton and used in pure form. Hydrogen is provided by AGA and purified before use.

Propylene is provided by *Borealis* and adequately purified before use.

Triphenylcarbeniumtetrakis(pentafluorophenyl)borate (alternative name trityl tetrakis(pentafluorophenyl)borate) (CAS 136040-19-2) was purchased from Acros.

N,N-dimethylanilinium tetrakis(pentafluorophenyl)borate has CAS no 118612-00-3

Measurement Methods

ICP Analysis

The elemental analysis of a catalyst was performed by taking a solid sample of mass, m. The catalyst was deactivated by substituting the inert storing conditions with ambient air, first passively through a needle and the actively by applying vacuum three times to the sampling container.

Samples were dissolved to a volume V by first cooling on dry ice while adding freshly deionised water (5% of V) and nitric acid ($HNO_3$, 65%, 5% of V). The samples were transferred in full to volumetric flasks using deionised water and rinsing the sampling containers. Hydrofluoric acid (HF, 40%, 3% of V) was added to the volumetric flasks and volume V obtained by addition of freshly deionised water. The prepared sample solutions were left to stabilise for two hours.

The analysis was run at room temperature using a Thermo Elemental iCAP 6300 Inductively Coupled Plasma—Optical Emission Spectrometer (ICP-OES) which was calibrated using a blank (a solution of 5% HNO3, 5% HF in deionised water), and 6 standards of 0.5 ppm, 1 ppm, 10 ppm, 50 ppm, 100 ppm and 300 ppm of Al, with 0.5 ppm, 1 ppm, 5 ppm, 20 ppm, 50 ppm and 100 ppm of B and P in solutions of 5% HNO3, 3% HF in deionised water.

Immediately before analysis the calibration is 'resloped' using the blank and 100 ppm Al, 50 ppm B, P standard, a quality control sample (20 ppm Al, 5 ppm B, P in a solution of 5% HNO3, 3% HF in DI water) is run to confirm the reslope. The QC sample is also run after every 5th sample and at the end of a scheduled analysis set.

The content of boron was monitored using the 249.773 nm line and the content of phosphorus using 177.495 nm and 178.284 nm lines. The content of aluminium was monitored via the 167.079 nm line, when Al concentration in ICP sample was between 0-10 ppm (calibrated only to 100 ppm) and via the 396.152 nm line for Al concentrations above 10 ppm.

The reported values are an average of three successive aliquots taken from the same sample and are related back to the original catalyst by inputting the original mass of sample, m, and the dilution volume, V, into the software.

The content of hafnium was monitored using the 282.022 nm and 339.980 nm lines and the content for zirconium using 339.198 nm line.

The reported values are an average of three successive aliquots taken from the same sample and are related back to the original catalyst by inputting the original mass of sample, m, and the dilution volume, V, into the software.

DSC Analysis

The melting point ($T_m$) and crystallization temperature ($T_a$) were determined on a DSC200 TA instrument, by placing a 5-7 mg polymer sample, into a closed DSC aluminum pan, heating the sample from −10° C. to 210° C. at 10° C./min, holding for 5 min at 210° C., cooling from 210° C. to −10° C., holding for 5 min at −10° C., heating from −10° C. to 210° C. at 10° C./min. The reported $T_m$ is the maximum of the curve from the second heating scan and $T_c$ is the maximum of the curve of the cooling scan.

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 230° C. and may be determined at different loadings such as 2.16 kg ($MFR_2$) or 21.6 kg ($MFR_{21}$).

GPC: Molecular weight averages, molecular weight distribution, and polydispersity index ($M_n$, $M_w$, $M_w/M_n$)

Molecular weight averages (Mw, Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99. A Waters GPCV2000 instrument, equipped with differential refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/L 2,6-Di tert butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants for PS, PE and PP used are as per ASTM D 6474-99. All samples were prepared by dissolving 0.5-4.0 mg of polymer in 4 mL (at 140° C.) of stabilized TCB (same as mobile phase) and keeping for max. 3 hours at max. 160° C. with continuous gentle shaking prior sampling into the GPC instrument.

Synthesis of anti-dimethylsilylene(2-methyl-4-phenyl-5-methoxy-6-tert-butyl-indenyl)(2-methyl-4-(4-tert-butyl-phenyl)indenyl)zirconium dichloride (MC complex A)

4/7-(4-tert-Butylphenyl)-2-methyl-311H-indene

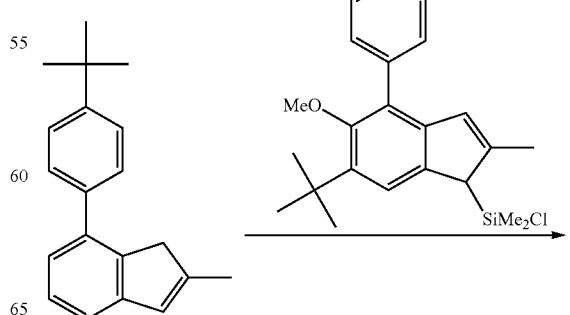

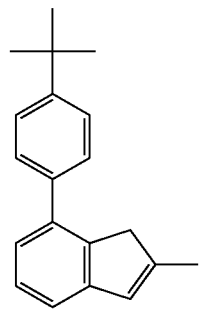

To a solution of 4-tert-butylphenylmagnesium bromide obtained from 110 g (0.518 mol) of 1-bromo-4-tert-butyl-benzene and 12.6 g (0.518 mol) of magnesium turnings in 500 ml of THF, 0.65 g (0.83 mmol) (IPr)NiCl$_2$PPh$_3$ and a solution of 77.6 g (0.371 mol) of 4/7-bromo-2-methyl-3/1H-indene in 50 ml of THF were added. This mixture was stirred at reflux for 30 min, and then for 20 min at room temperature. Finally, 150 ml of water and then 70 ml of 4 M HCl were added. The product was extracted with 200 ml of ether and then 2×100 ml of dichloromethane. The combined organic extract was dried over K$_2$CO$_3$, passed through a short column with Silica Gel 60, and evaporated to dryness. Rectification of the residue, b.p. 163-171° C./5 mm Hg, gave 93.8 g (96%) of a mixture of the title isomeric indenes as yellowish viscous oil which is slowly crystallized.

Anal. calc. for C$_{20}$H$_{22}$: C, 91.55; H, 8.45. Found: C, 91.62; H, 8.52.

$^1$H NMR (CDCl$_3$): δ 7.62 (m, C$_6$H$_4$ of both isomers), 7.46 (m, 5- and 6-H in 4- and 7-arylindenes), 7.40 (m, 7- and 4-H in 4- and 7-arylindenes), 7.31 (m, 6- and 5-H in 4- and 7-arylindenes), 6.88 (m, 3-H in 4/7-arylindene), 6.68 (m, 3-H in 7/4-arylindene), 3.55 (m, 1-CH$_2$ in 7/4-arylindene), 3.49 (m, 1-CH$_2$ in 4/7-arylindene), 2.28 (2-Me in 4/7-arylindene), 2.27 (2-Me in 7/4-arylindene), 1.54 (s, $^t$Bu in 4- and 7-arylindenes).

(6-tert-Butyl-5-methoxy-2-methyl-4-phenyl-1H-inden-1-yl)[4-(4-tert-butylphenyl)-2-methyl-1H-inden-1-yl]dimethylsilane 1. $^n$BuLi, Et$_2$O
2. CuCN
3.

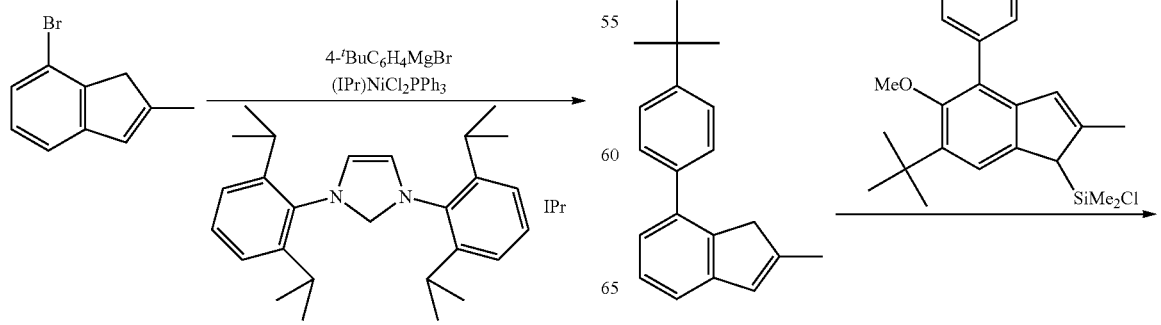

25
-continued

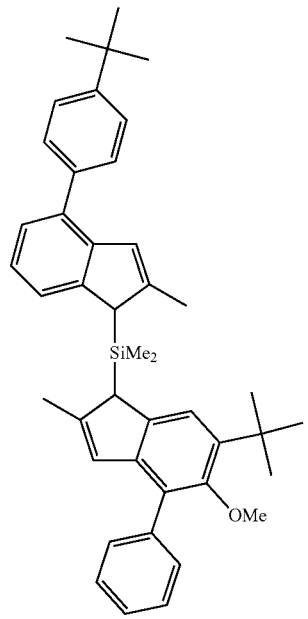

To a solution of 11.5 g (43.8 mmol) of 7-(4-tert-butyl-phenyl)-2-methyl-1H-indene in 300 ml of ether, 17.0 ml (42.5 mmol) of 2.5 M $^n$BuLi in hexanes was added in one portion at −78° C. This mixture was stirred overnight at room temperature, then cooled to −60° C., and 150 mg of CuCN was added. The resulting mixture was stirred for 1 h at −20° C., then cooled to −70° C., and 16.2 g of (6-tert-butyl-5-methoxy-2-methyl-4-phenyl-1H-inden-1-yl)(chloro)-dimethylsilane (42.08 mmol) in 150 ml of ether was added. Further on, this mixture was stirred overnight at ambient temperature, then 0.5 ml of water was added. This solution was filtered through a pad of silica gel 60 (40-63 um) which was additionally washed by dichloromethane. The combined organic elute was evaporated to dryness, and the obtained yellowish oil was purified by flash chromatography on silica gel 60 (40-63 um; eluent: hexane-dichloromethane, from 10:1 to 3:1, vol.). This procedure gave 23.4 g (91%) of the title compound as yellowish glass.

Anal. Calcd. for $C_{43}H_{50}OSi$: C, 84.54; H, 8.25%. Found: C, 84.70; H, 8.33%.

$^1$H NMR (CDCl$_3$): δ 7.59-7.18 (m), 6.89 (m), 6.83 (m), 6.51 (m), 6.48 (m), 3.77 (m), 3.73 (m), 3.68-3.70 (m), 3.31 (s), 3.29 (s), 2.25 (s), 2.23 (s), 2.16 (s), 2.10 (s), 1.50 (s), 1.48 (s), 1.45 (s), 1.44 (s), 0.00 (s), −0.09 (s), −0.11 (s), −0.12 (s).

26

Anti- and syn-dimethylsilylene(2-methyl-4-phenyl-5-methoxy-6-tert-butyl-indenyl)(2-methyl-4-(4-tert-butyl-phenyl)indenyl)zirconium dichloride (MC complex A)

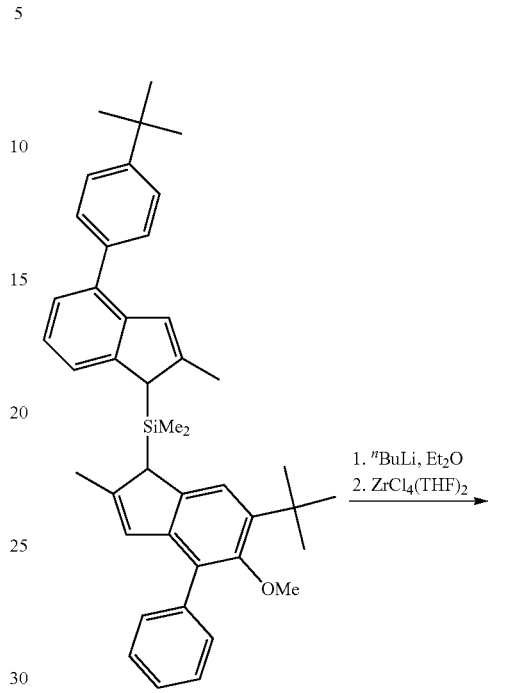

To a solution of 15.3 g (25.0 mmol) of (6-tert-butyl-5-methoxy-2-methyl-4-phenyl-1H-inden-1-yl)[4-(4-tert-butylphenyl)-2-methyl-1H-inden-1-yl]dimethylsilane in 300 ml of ether cooled to −78° C., 20.0 ml (50.0 mmol) of 2.5 M $^n$BuLi in hexanes was added in one portion. This mixture was stirred overnight at room temperature, then cooled to −60° C., and 9.43 g (25.0 mmol) of ZrCl$_4$(THF)$_2$ was added. The resulting mixture was stirred for 24 h (a light orange solution with a significant amount of precipitate was formed), then evaporated to dryness, and 350 ml of toluene was added. The resulting solution warmed to 80° C. was filtered through glass frit (G4) to form on the evidence of NMR spectroscopy a ca. 1 to 1 mixture of anti- and syn-zirconocenes. Crystals precipitated overnight from this solution at room temperature were collected, washed by 2×10 ml of cold toluene, and dried in vacuum. This procedure gave 3.50 g of pure syn-zirconocene as a light-orange microcrystalline powder. The mother liquor was evaporated to ca. 100 ml. Crystals precipitated overnight from this solution at room temperature were collected, washed with 10 ml of cold toluene, and dried in vacuum. This procedure gave additional amount (4.10 g) of pure syn-zirconocene. Thus, the combined yield of pure syn-zirconocene was 7.60 g (39%) as a light-orange microcrystalline powder. Crystals precipitated after 3 days at room temperature were collected, washed by 10 ml of cold toluene, and dried in vacuum. This procedure gave 2.95 g of pure anti-zirconocene as a slightly orange microcrystalline powder. Additional amount of this product was obtained in a similar manner from mother liquor evaporated to ca. 35 ml. Thus, the combined yield of anti-zirconocene was 5.65 g (29%).

anti-MC A

Anal. Calcd. for $C_{43}H_{48}Cl_2OSiZr$: C, 66.98; H, 6.27%. Found: C, 67.00; H, 6.31%.

$^1$H NMR (CDCl$_3$): δ 7.61-7.63 (m, 3H, 2, 6-H in $C_6H_4$ and 5-H in indenyl of I), 7.54 (s, 1H, 7-H in indenyl of II), 7.46-7.48 (m, 2H, 3, 5-H in $C_6H_4$ of I), 7.42 (m, 2H, 3, 5-H in Ph of II), 7.37 (d, J=7.1 Hz, 1H, 7-H in indenyl of I), 7.32 (m, 1H, 4-H in Ph of II), 7.09 (dd, J=8.6 Hz, J=7.1 Hz, 1H, 6-H in indenyl of I), 7.02 (s, 1H, 3-H in indenyl of II), 6.57 (s, 1H, 3-H in indenyl of I), 3.39 (s, 3H, OMe), 2.25 (s, 3H, 2-Me in I), 2.17 (s, 3H, 2-Me in II), 1.39 (s, 9H, 6-$^t$Bu in II), 1.33 (s, 9H, 4-$^t$Bu in I), 1.31 (s, 6H, SiMe$_2$); where I is 4-(4-tert-butylphenyl)-2-methyl-1H-inden-1-yl, II—6-tert-butyl-5-methoxy-2-methyl-4-phenyl-1H-inden-1-yl.

syn-MC A

Anal. Found: C, 66.12; H, 6.35%.

$^1$H NMR (CDCl$_3$): δ 7.64 (m, 1H, 5-H in indenyl of I), 7.56-7.58 (m, 2H, 2, 6-H in $C_6H_4$ of I), 7.54 (s, 1H, 7-H in indenyl of II), 7.44-7.46 (m, 2H, 3, 5-H in $C_6H_4$ of I), 7.41 (m, 2H, 3, 5-H in Ph of II), 7.30 (m, 1H, 4-H in Ph of II), 7.15 (d, J=7.1 Hz, 1H, 7-H in indenyl of I), 6.91 (s, 1H, 3-H in indenyl of II), 6.87 (dd, J=8.6 Hz, J=7.1 Hz, 1H, 6-H in indenyl of I), 6.47 (s, 1H, 3-H in indenyl of I), 3.20 (s, 3H, OMe), 2.44 (s, 3H, 2-Me in I), 2.37 (s, 3H, 2-Me in II), 1.44 (s, 3H, SiMeMe'), 1.34 (s, 9H, 6-$^t$Bu in II), 1.33 (s, 9H, 4-$^t$Bu in I), 1.22 (s, 3H, SiMeMe'); where I is 4-(4-tert-butylphenyl)-2-methyl-1H-inden-1-yl, II—6-tert-butyl-5-methoxy-2-methyl-4-phenyl-1H-inden-1-yl.

Catalyst Preparation Examples

Example 1 (Ex1)

Boron Modified Catalyst Synthesis with MC Complex A rac-anti-Me$_2$Si(2-Me-4-(p-tBuPh)-Ind)(2-Me-4-Ph-5-OMe-6-tBu-Ind)ZrCl$_2$ Inside the glovebox, 80 μL of dry and degassed surfactant were mixed with 2 mL of MAO in a septum bottle. Then, in another septum bottle, 58.68 mg of MC complex A (0,076 mmol, 1 equivalent) were mixed with 4 mL of the MAO solution. The mixture was stirred for 60 minutes and then 129.1 mg of trityl tetrakis(pentafluorophenyl)borate was added (B/Zr (mol/mol)=1.84). The two mixtures were left to react overnight at room temperature inside the glovebox.

The following day, 4 mL of the MAO-metallocene solution and 1 mL of the surfactant solution were successively added into a 50 mL emulsification glass reactor containing 40 mL of PFC at −10° C. and equipped with an overhead stirrer (stirring speed=600 rpm). Total amount of MAO is 5 mL (300 equivalents). A red emulsion formed immediately (measured emulsion stability=17 seconds) and stirred during 15 minutes at −10° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 35 minutes the solvent was siphoned off. The remaining red catalyst was dried during 2 hours at 50° C. over an argon flow. 0.55 g of a red free flowing powder was obtained.

Comparative Example 1 (Cex1)

No Borate Modification

Inside the glovebox, 80 μL of dry and degassed surfactant were mixed with 2 mL of MAO in a septum bottle and left to react overnight. The following day, 58.9 mg of MC Complex A (0,076 mmol, 1 equivalent) were dissolved with 4 mL of the MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). Total amount of MAO is 5 mL (300 equivalents). A red-orange emulsion formed immediately (measured emulsion stability=15 seconds) and stirred during 15 minutes at −10° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 35 minutes the solvent was siphoned off. The remaining red catalyst was dried during 2 hours at 50° C. over an argon flow. 0.62 g of a red free flowing powder was obtained.

TABLE 1

| | Catalyst elemental analysis. | | |
|---|---|---|---|
| Catalyst | Al (wt-%) | Zr (wt-%) | Al/Zr (mol/mol) |
| Ex1 | 25.8 | 0.31 | 281 |
| Cex1 | 18.9 | 0.24 | 266 |

Polymerisation Examples P1, P2 and CP1, CP2

Propylene Homopolymerisation

The polymerisations were performed in a 5 L reactor. 200 μl of triethylaluminum was fed as a scavenger in 5 mL of dry and degassed pentane. The desired amount of hydrogen was then loaded (measured in mmol) and 1100 g of liquid propylene was fed into the reactor. The temperature was set to 30° C. The desired amount of catalyst (3 to 15 mg) in 5 mL of PFC is flushed into the reactor with a nitrogen overpressure. The temperature is then raised to 70° C. over a period of 15 minutes. The polymerisation is stopped after 30 minutes by venting the reactor and flushing with nitrogen before the polymer is collected.

The catalyst activity was calculated on the basis of the 30 minutes period according to the following formula:

$$\text{Catalyst Activity (kg/(g(cat)} * h)) = \frac{\text{amount of polymer produced (kg)}}{\text{catalyst loading (g)} \times \text{polymerisation time (h)}}$$

TABLE 2

Polymerisation results using catalysts of Ex 1 and Cex 1

| Pol | Cat | Cat amount/mg | $H_2$/ mmol | Polymer yield/g | Activity/kg/ (g(cat)*h)) | $MFR_{21}$ (g/10 min) | $M_w/M_n$ | $T_m$ (° C.) | $T_c$ (° C.) |
|---|---|---|---|---|---|---|---|---|---|
| P1 | Ex 1 | 5.5 | 6.0 | 189 | 68.6 | 20.0 | 2.4 | 154.9 | 111.0 |
| P2 | Ex 1 | 7.3 | 15.0 | 355 | 97.3 | 170.0 | 2.8 | 154.4 | 111.1 |
| CP1 | Cex 1 | 4.9 | 6.0 | 127 | 51.8 | 19.0 | 2.4 | 147.5 | 107.8 |
| CP2 | Cex 1 | 12.1 | 15.0 | 414 | 68.4 | 2.4* | 2.5 | 149.1 | 107.5 |

*= $MFR_2$

As can see from the results, melting point of polymers produced by catalysts having a mixture of Al- and B-based cocatalysts are at least 5° C. higher than without B-based cocatalyst. In addition, increase in activity can be seen.

Catalyst Preparation Example 2-5 (Ex2-Ex5)

Boron Modified Catalyst Synthesis with MC Complex B rac-cyclohexyl(methyl)silanediylbis[2-methyl-4-(4'-tert-butylphenyl)indenyl]zirconium dichloride (CAS no 888227-55-2, WO2006/060544, obtained from commercial source)

Inside the glovebox, 0.08 mL (80 μL) of surfactant was mixed with 2 mL of MAO in a septum bottle. Inside the glove box, 10 mg oft rac-cyclohexyl(methyl)silanediylbis [2-methyl-4-(4'-tert-butylphenyl)indenyl]zirconium dichloride, (MC complex B), (CAS no 888227-55-2, WO2006/060544, obtained from commercial source) was dissolved with 2 mL of 30 wt-% MAO in a septum bottle. This was stirred for 30 minutes. 1.6 ml of MAO was placed in another septa bottle, then 0.4 ml of the MAO/metallocene complex mixture was added just 30 min before 27 μL the surfactant as defined hereinbefore was added. This was left overnight in glove box.

A mixture of 61.5 mg of the MC B and 4 ml of MAO was prepared in a septum bottle inside the glove box and stirred for 60 minutes. Borate cocatalyst was added and reacted overnight at room temperature. Borate type and amounts in preparation as B/Zr mol/mol ratio are disclosed in table 3.

In a 50 mL emulsification glass reactor (equipped with "open baffles" and an overhead stirrer), a liquid-liquid 2-phase system was generated at −10° C. from 40 mL of perfluoro-1,3-dimethylcyclohexane (PFC) (degassed for at least 30 min with Argon). The emulsion reactor was cooled down to −10° C. and the complex+MAO+borate added followed by 1 ml of MC B+MAO+surfactant mixture. The reaction mixture was stirred for 3 min, and stirring was continued further 15 min at ~−10° C. and 600 rpm, after which the emulsion was transferred via 2/4 teflon tube and under stirring to 100 mL of hot perfluoro-1,3-dimethylcyclohexane (heated up with an oil bath at 90° C., and stirred at 600 rpm). Stirring was continued for 15 min, the oil bath was taken down and the mixing speed was reduced to 300 rpm for and finally switched off. Catalyst was let to float for 35 min and siphonated nicely separated PFC away. The catalyst was dried for 2 hours at 50° C. over a flow of Argon. 0.44 g of nice red catalyst was yielded.

Comparative Catalyst 2 (Cex 2)

Comparative catalyst 2 was prepared as catalyst preparation Ex2 but no boron was used in the synthesis.

Polymerisation Examples P3-P6 and CP3

PP Homopolymerisation

Polymerisations were carried as above with hydrogen amount 15 mmol.

TABLE 3

Homopolymerisation results of P3-P6 and CP3

| Poly Ex | Cat | Boron compound | B/Zr mol/mol | Polym Cat. (mg) | Act'ty (kg/g/h) | MFR$_2$ (g/10 min) | Polymer properties $T_m$ (° C.) | %-cryst. |
|---|---|---|---|---|---|---|---|---|
| P3 | Ex 2 | N,N-dimethyl- | 0.5 | 18.3 | 42.6 | 6.5 | 156.2 | 43 |
| P4 | Ex 3 | anilinium tetrakispentafluorophenyl borate | 1.80 | 18.9 | 45.9 | 7.1 | 156.5 | 45 |
| P5 | Ex 4 | Ph$_3$CB(PhF$_5$)$_4$ | 0.5 | 15.2 | 44.0 | 8.3 | 155.9 | 44 |
| P6 | Ex 5 | | 1.80 | 13.7 | 49.2 | 7 | 156.0 | 44 |
| CP3 | Cex 2 | No boron- | 0 | 16 | 39.4 | 13.8 | 152.2 | 43 |

Tm has been increased when catalysts of the invention have been used in homopolymerisation. In addition increase in activity can be seen.

Catalyst Preparation Example 6 (Ex6)

Catalyst was prepared in the same manner as in Catalyst Preparation Example Ex3, but as metallocene was used rac-dimethylsilanediylbis(2-methyl-4-phenylindenyl)zirconium dichloride (MC complex C)

Comparative Catalyst Preparation Example 3 (Cex3)

C7 was prepared in the same manner as Ex 6, however, without using any boron-compound.

Propylene Homopolymerisation Examples P7 and CP4

Homopolymerisation was carried as above, but using catalysts Ex6 and Cex3.

TABLE 4

Polymerisation results of P7 and CP4

| Polymerisation | Catalyst | Boron compound | B/Zr mol/mol | Catalyst (mg) | Polymerisation Activity kg/g/h | Polymer properties $T_m$ (° C.) |
|---|---|---|---|---|---|---|
| P7 | Ex 6 | N,N-dimethyl-anilinium tetrakispentafluoro-phenyl borate | 1.80 | 13.1 | 30.5 | 156.4 |
| CP4 | Cex 3 | No boron-reference | 0 | 27.7 | 14.9 | 150.4 |

In the presence of borate cocatalyst $T_m$ of polymer has increased 6° C. in homopolymerisation. In addition catalyst activity has doubled.

The invention claimed is:

1. A process for the preparation of a propylene homopolymer comprising polymerizing propylene in the presence of a catalyst, the catalyst comprising:
   (i) a metallocene complex of formula (II)

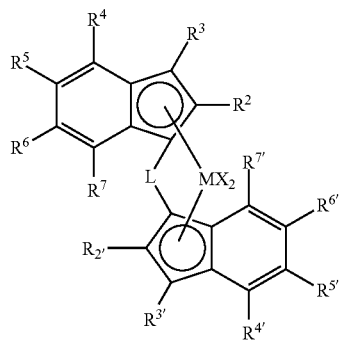

wherein
M is a group (IV) metal;
each X is a sigma ligand;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, and tri($C_1$-$C_{20}$-alkyl)silyl;
$R^2$ and $R^{2'}$ are each independently H, or a $C_1$-$C_{20}$ hydrocarbyl radical optionally containing one or more heteroatoms from groups 14-16;
$R^3$ and $R^{3'}$ are each independently H or a $C_1$-$C_{20}$ hydrocarbyl radical optionally containing one or more heteroatoms from groups 14-16;
$R^4$ or $R^{4'}$ are each independently an aryl or heteroaryl group having up to 20 carbon atoms optionally substituted by one or more groups $R^1$;
$R^5$ and $R^{5'}$ are each independently H or a $C_{1-20}$ hydrocarbyl group optionally containing one or more heteroatoms from groups 14-16 and optionally substituted by one or more halo atoms;
$R^6$ and $R^{6'}$ are each independently hydrogen or a $C_{1-20}$ hydrocarbyl group optionally containing one or more heteroatoms from groups 14-16; or wherein $R^5$ and $R^6$ and/or $R^{5'}$ and $R^{6'}$ taken together form a 4-7 membered ring condensed to the benzene ring of the indenyl moiety, said ring optionally containing heteroatoms from groups 14-16, each atom forming said ring being optionally substituted with at least one $R^1$ radical;
$R^7$ and $R^{7'}$ are each independently hydrogen or $C_{1-20}$ hydrocarbyl group optionally containing one or more heteroatoms from groups 14-16; and
$R^1$ is a $C_{1-20}$ hydrocarbyl group or two $R^1$ groups on adjacent carbon atoms taken together can form a fused 5 or 6 membered non aromatic ring with the $R^4$ or $R^{4'}$ group, said ring optionally substituted with one or more $R^1$ groups;
(ii) a boron cocatalyst; and
(iii) an aluminoxane cocatalyst;
said catalyst being in solid form and free from an external carrier;
wherein the melting point of the propylene homopolymer is at least 152.5° C.

2. The process according to claim 1, wherein the boron cocatalyst is a borate-type cocatalyst.

3. The process according to claim 1, wherein the catalyst is prepared by a process comprising
   (a) forming a liquid/liquid emulsion system said liquid/liquid emulsion system comprising a solution of components (i) to (iii) dispersed in a solvent so as to form dispersed droplets; and
   (b) forming solid particles by solidifying said dispersed droplets.

4. The process according to claim 3 further comprising step
   (c) prepolymerizing the solid particles from step (b) with at least one $C_2$-$C_{10}$ alpha-olefin monomer and optionally one or more different $C_2$-$C_{10}$ alpha-olefin comonomers.

5. The process according to claim 1, wherein said metallocene catalyst is of formula (II):

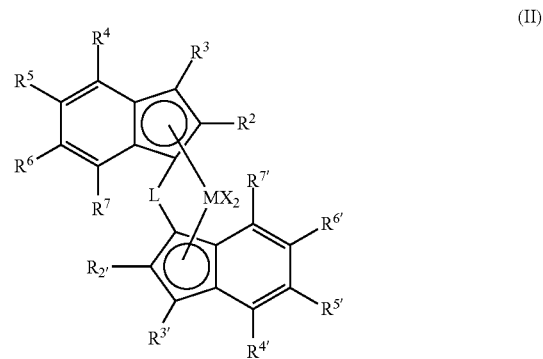

wherein
M is a group (IV) metal;
each X is a sigma ligand;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, and tri($C_1$-$C_{20}$-alkyl)silyl;
$R^2$ and $R^{2'}$ are each independently H, or a $C_1$-$C_{20}$ hydrocarbyl radical optionally containing one or more heteroatoms from groups 14-16;

$R^3$ and $R^{3'}$ are each independently H or a $C_1$-$C_{20}$ hydrocarbyl radical optionally containing one or more heteroatoms from groups 14-16;

$R^4$ or $R^{4'}$ are each independently an aryl or heteroaryl group having up to 20 carbon atoms optionally substituted by one or more groups $R^1$;

$R^5$ and $R^{5'}$ are each independently H or a $C_{1-20}$ hydrocarbyl group optionally containing one or more heteroatoms from groups 14-16 and optionally substituted by one or more halo atoms;

$R^6$ and $R^{6'}$ are each independently hydrogen or a $C_{1-20}$ hydrocarbyl group optionally containing one or more heteroatoms from groups 14-16;

$R^7$ and $R^{7'}$ are each independently hydrogen or $C_{1-20}$ hydrocarbyl group optionally containing one or more heteroatoms from groups 14-16; and $R^1$ is a $C_{1-20}$ hydrocarbyl group or two $R^1$ groups on adjacent carbon atoms taken together can form a fused 5 or 6 membered non aromatic ring with the $R^4$ or $R^{4'}$ group, said ring optionally substituted with one or more $R^1$ groups.

6. The process according to claim 1, wherein said metallocene catalyst is of formula (III)

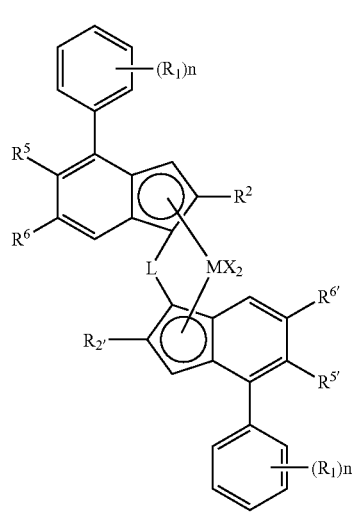

(III)

wherein M is Hf or Zr;

each X is independently a hydrogen atom, a halogen atom, $C_{1-6}$ alkoxy group, $C_{1-6}$ alkyl, phenyl or benzyl group;

L is a divalent bridge selected from —R'$_2$C— and —R'$_2$Si— wherein each R' is independently a hydrogen atom, $C_{1-20}$ alkyl or $C_{3-10}$ cycloalkyl;

$R^2$ and $R^{2'}$ are each independently H, a linear $C_1$-$C_6$ alkyl or branched $C_{4-10}$-alkyl, especially methyl or isobutyl;

n is 0, 1 or 2;

$R^1$— is $C_{1-6}$ alkyl group;

$R^5$ and $R^{5'}$ are each independently H, phenyl, a $C_{1-10}$ alkyl group or $OC_{1-10}$ alkyl group;

$R^6$ and $R^{6'}$ are each independently hydrogen or a $C_{1-10}$ alkyl group; or $R^5$ and $R^6$ and/or $R^{5'}$ and $R^{6'}$ taken together form a 5-6 membered ring condensed to the benzene ring of the indenyl moiety being optionally substituted with one $R^1$ radical.

7. The process according to claim 1, wherein said metallocene catalyst is of formula (IV)

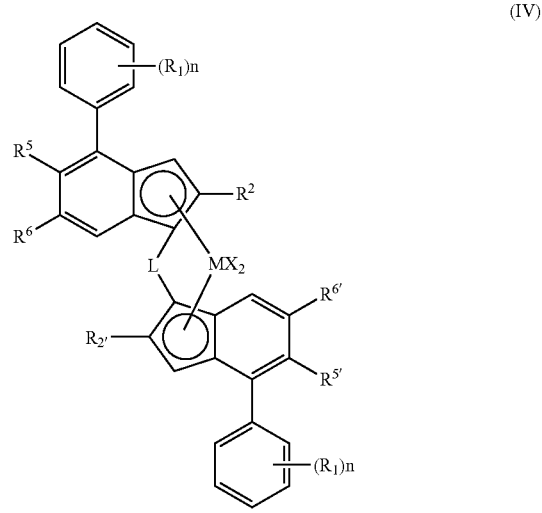

(IV)

wherein M is Hf or Zr;

each X is independently a hydrogen atom, a halogen atom, $C_{1-6}$ alkoxy group, $C_{1-6}$ alkyl, phenyl or benzyl group;

L is a divalent bridge selected from —R'$_2$C— and —R'$_2$Si— wherein each R' is independently a hydrogen atom, $C_{1-20}$ alkyl or $C_{3-10}$ cycloalkyl;

$R^2$ and are each independently $C_{1-6}$ alkyl;

n is 0, 1 or 2;

$R^1$ is $C_{3-6}$ alkyl group;

$R^5$ and $R^{5'}$ are each independently H, a $C_{1-6}$ alkyl group or $OC_{1-6}$ alkyl group;

$R^6$ and $R^{6'}$ are each independently H or a $C_{1-6}$ alkyl group; or $R^5$ and $R^6$ and/or $R^{5'}$ and $R^{6'}$ taken together form an unsubstituted 5 membered ring condensed to the benzene ring of the indenyl moiety.

8. The process according to claim 1, wherein said process is carried out at a temperature of 60° C. or more.

9. The process according to claim 1, wherein said aluminoxane is MAO.

10. The process according to claim 1, wherein said boron cocatalyst comprises an anion of formula:

$$(Z)_4B^- \qquad (V)$$

where Z is an optionally substituted phenyl derivative, said substituent is a $C_{1-6}$ alkyl group, halo$C_{1-6}$-alkyl or halo group.

11. The process according to claim 1, wherein the process is by heterogeneous polymerization.

12. The process according to claim 1, wherein said propylene homopolymer is isotactic.

13. A process for the preparation of a propylene homopolymer comprising polymerizing propylene in the presence of a catalyst, the catalyst comprising:

(i) a metallocene complex of formula (II)

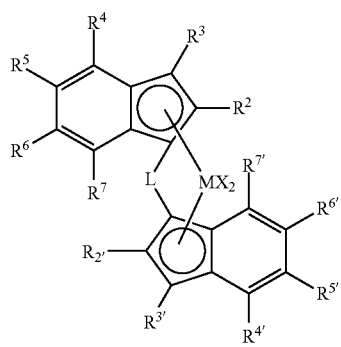

(II)

wherein
M is a group (IV) metal;
each X is a sigma ligand;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, and tri($C_1$-$C_{20}$-alkyl)silyl;
$R^2$ and $R^{2'}$ are each independently H, or a $C_1$-$C_{20}$ hydrocarbyl radical optionally containing one or more heteroatoms from groups 14-16;
$R^3$ and $R^{3'}$ are each independently H or a $C_1$-$C_{20}$ hydrocarbyl radical optionally containing one or more heteroatoms from groups 14-16;
$R^4$ or $R^{4'}$ are each independently an aryl or heteroaryl group having up to 20 carbon atoms optionally substituted by one or more groups $R^1$;
$R^5$ and $R^{5'}$ are each independently H or a $C_{1-20}$ hydrocarbyl group optionally containing one or more heteroatoms from groups 14-16 and optionally substituted by one or more halo atoms;
$R^6$ and $R^{6'}$ are each independently hydrogen or a $C_{1-20}$ hydrocarbyl group optionally containing one or more heteroatoms from groups 14-16; or wherein $R^5$ and $R^6$ and/or $R^{5'}$ and $R^{6'}$ taken together form a 4-7 membered ring condensed to the benzene ring of the indenyl moiety, said ring optionally containing heteroatoms from groups 14-16, each atom forming said ring being optionally substituted with at least one $R^1$ radical;
$R^7$ and $R^{7'}$ are each independently hydrogen or $C_{1-20}$ hydrocarbyl group optionally containing one or more heteroatoms from groups 14-16; and
$R^1$ is a $C_{1-20}$ hydrocarbyl group or two $R^1$ groups on adjacent carbon atoms taken together can form a fused 5 or 6 membered non aromatic ring with the $R^4$ or $R^{4'}$ group, said ring optionally substituted with one or more $R^1$ groups;

(ii) a boron cocatalyst; and
(iii) an aluminoxane cocatalyst;
wherein the catalyst is in a solid form and is free from an external carrier.

14. The process according to claim 10, wherein Z is selected from a triphenylcarbeniumtetrakis(pentafluorophenyl) borate, a N,N-dimethylcyclohexylammoniumtetrakis(pentafluorophenyl)borate, a N,N-dimethylbenzylammoniumtetrakis(pentafluorophenyl)borate, and a (N,N-dimethylaniliniumtetrakis(pentafluorophenyl)borate).

* * * * *